US010188948B2

(12) United States Patent
Okajima et al.

(10) Patent No.: US 10,188,948 B2
(45) Date of Patent: Jan. 29, 2019

(54) GAME IMAGE PROCESSING SYSTEM AND PROGRAM

(71) Applicants: EARTHBEAT, INC., Shibuya-ku, Tokyo (JP); TECTECH CO., LTD., Chuo-ku, Tokyo (JP)

(72) Inventors: Shigeo Okajima, Tokyo (JP); Kazuya Asano, Tokyo (JP); Hiroto Tamura, Tokyo (JP)

(73) Assignees: EARTHBEAT, INC., Shibuya-ku, Tokyo (JP); DWANGO Co., Ltd., Chuo-ku, Tokyo (JP)

( * ) Notice: Subject to any disclaimer, the term of this patent is extended or adjusted under 35 U.S.C. 154(b) by 0 days.

(21) Appl. No.: 15/989,180

(22) Filed: May 25, 2018

(65) Prior Publication Data

US 2018/0345146 A1 Dec. 6, 2018

Related U.S. Application Data

(63) Continuation of application No. PCT/JP2016/071928, filed on Jul. 26, 2016.

(30) Foreign Application Priority Data

Nov. 27, 2015 (JP) ................................. 2015-231330

(51) Int. Cl.
*A63F 13/5378* (2014.01)
*A63F 13/216* (2014.01)
(Continued)

(52) U.S. Cl.
CPC ........ *A63F 13/5378* (2014.09); *A63F 13/216* (2014.09); *A63F 13/332* (2014.09);
(Continued)

(58) Field of Classification Search
CPC .............................................. G06T 2219/2012
See application file for complete search history.

(56) References Cited

U.S. PATENT DOCUMENTS

| 2006/0119617 A1 | 6/2006 | Toyooka et al. | |
|---|---|---|---|
| 2008/0146338 A1* | 6/2008 | Bernard | A63F 13/00 463/42 |
| 2012/0092367 A1* | 4/2012 | Suzuki | G06T 19/006 345/632 |

FOREIGN PATENT DOCUMENTS

| JP | 2001-070658 A | 3/2001 |
|---|---|---|
| JP | 2002-273053 A | 9/2002 |

(Continued)

OTHER PUBLICATIONS

International Search Report for PCT/JP2016/071928 dated Nov. 1, 2016.
PCT written opinion dated Nov. 1, 2016.

*Primary Examiner* — Robert T Clarke, Jr.
(74) *Attorney, Agent, or Firm* — Yokoi & Co., U.S.A.; Toshiyuki Yokoi

(57) ABSTRACT

To improve the user friendliness of switching a map display between the real world and a virtual world while also improving the entertainment value of the game and avoiding the danger arising from using a smartphone while walking. There are provided: a game progress processing unit that progresses a game; a real map storage unit that stores real map information about the real world; a virtual map information generation unit that generates virtual map information including coordination information for an object in virtual geographical information corresponding to geographical information in the real map information; a position information acquisition unit that acquires a user's current position in the real world; a real display data generation unit that generates real display data indicating the user's current (Continued)

position in the user's real map information; a virtual display data generation unit that generates virtual display data in which a character is represented in the virtual map information corresponding to the user's current position on the basis of the user's current position acquired by the position information acquisition unit; and a display control unit that displays the real display data and the virtual display data.

10 Claims, 18 Drawing Sheets

(51) Int. Cl.
*A63F 13/65* (2014.01)
*A63F 13/428* (2014.01)
*A63F 13/332* (2014.01)
*G06T 19/20* (2011.01)
*G06T 17/05* (2011.01)
*G06T 19/00* (2011.01)

(52) U.S. Cl.
CPC ............ *A63F 13/428* (2014.09); *A63F 13/65* (2014.09); *G06T 17/05* (2013.01); *G06T 19/003* (2013.01); *G06T 19/20* (2013.01); *G06T 2219/2012* (2013.01)

(56) References Cited

FOREIGN PATENT DOCUMENTS

| | | |
|---|---|---|
| JP | 2003-000940 A | 1/2003 |
| JP | 2003-305276 A | 10/2003 |
| JP | 2012-215446 A | 11/2012 |
| JP | 2013-228770 A | 11/2013 |

* cited by examiner

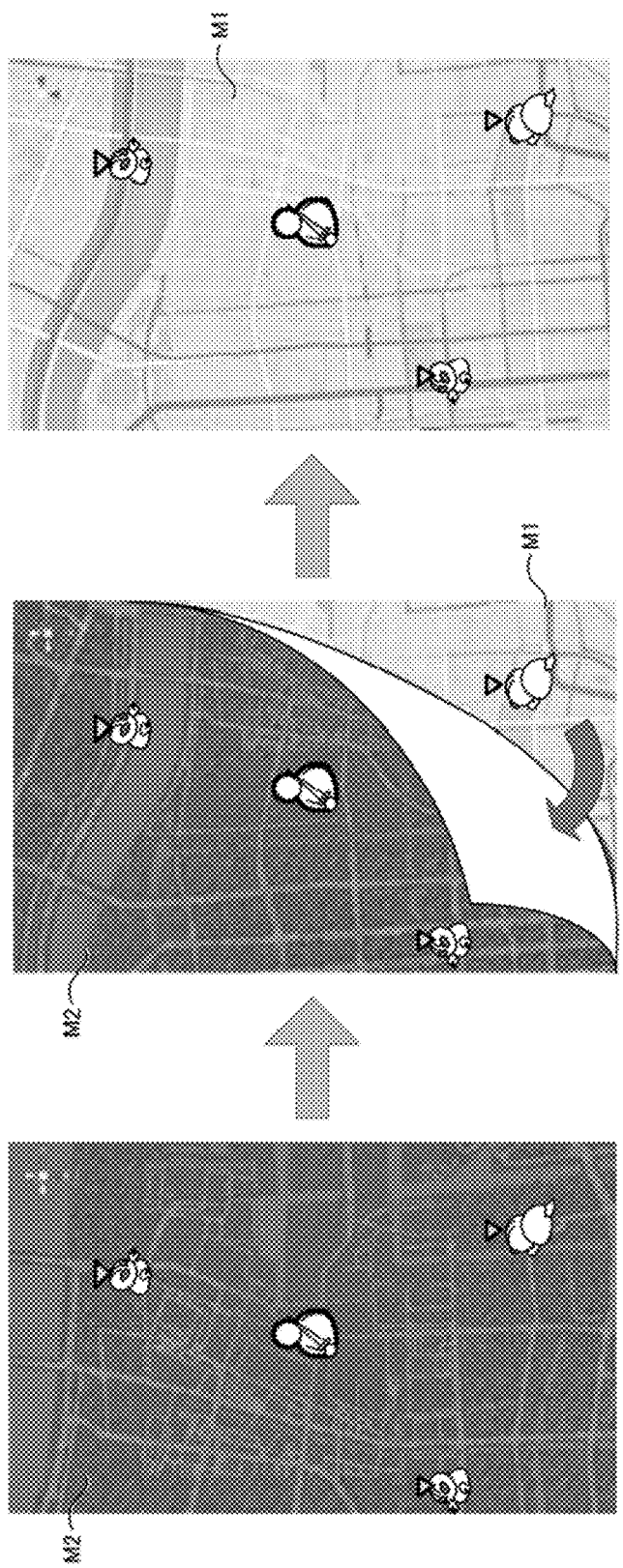

Fig. 12
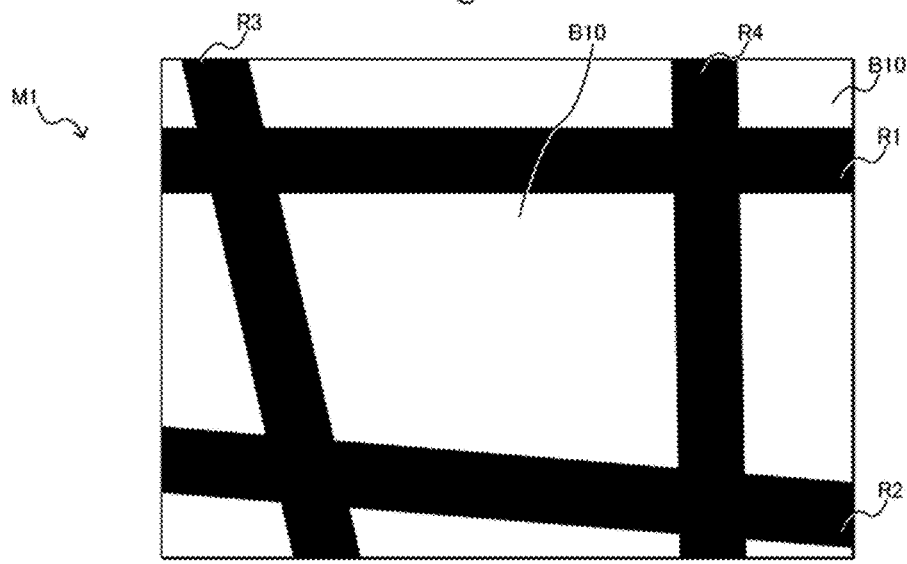
Fig. 13A  Fig. 13B  Fig. 13C
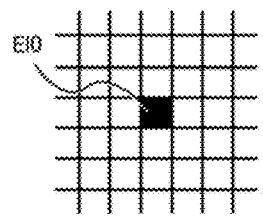 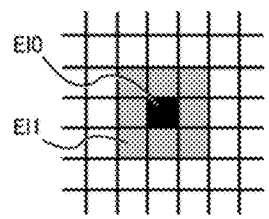 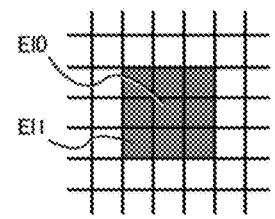
Fig. 14
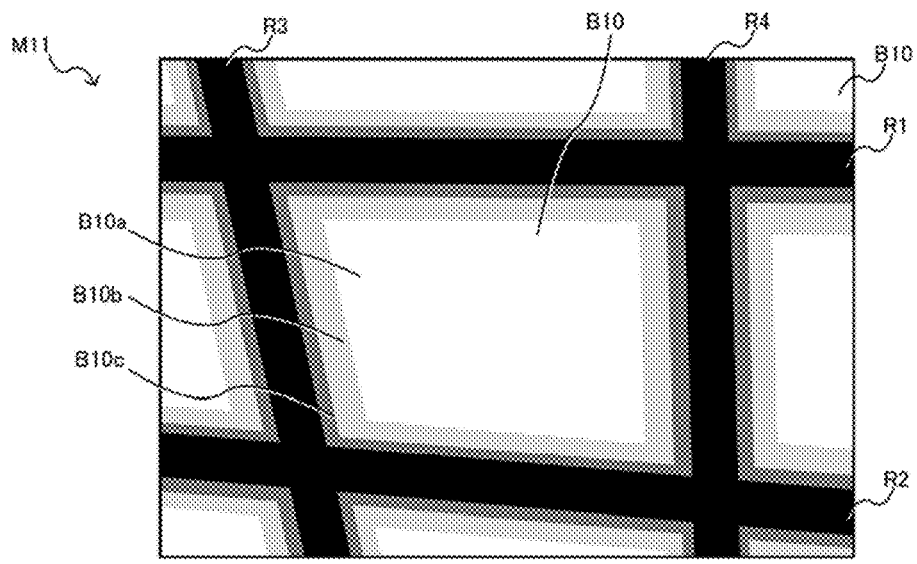

GAME IMAGE PROCESSING SYSTEM AND PROGRAM

CROSS-REFERENCES TO RELATED APPLICATIONS

This Application claims the benefit of priority and is a Continuation application of the prior International Patent Application No. PCT/JP2016/071928, with an international filing date of Jul. 26, 2016, which designated the United States, and is related to the Japanese Patent Application No. 2015-231330, filed Nov. 27, 2015, the entire disclosures of all applications are expressly incorporated by reference in their entirety herein.

BACKGROUND OF THE INVENTION

1. Field of the Invention

The present invention relates to a game image processing system and a program for generating virtual display data in a virtual world where characters corresponding to users and other objects move to execute various event processes and progress a game.

2. Description of Related Art

In recent years, portable information processing apparatuses capable of performing information communication through wireless communication, such as smartphones, cellular phones and mobile PCs, have spread with advanced multi-functionality while positional information services become available such as GPS.

In the past, various games have been proposed which make use of the portability of such information processing apparatuses and positional information services (for example, refer to Patent Document 1). The technique disclosed in this Patent Document 1 builds a game system which displays and controls a virtual position and a virtual displacement in a screen (virtual world) displayed by a role playing game in correspondence with a current position and a displacement thereof in a real world acquired on the basis of GPS or the like, and displays a second virtual world when the position overlaps with an event icon. It is therefore possible to realize a new entertainment by utilizing positional information and combining actual positional information with a conventional game system a non-conventional game system, and provide a system which make it possible that a walker can enjoy exercise by actually moving.

PRIOR ART LITERATURE

Patent Document

[Patent Document 1] Japanese Unexamined Patent Application Publication No. 2001-70658

BRIEF SUMMARY OF THE INVENTION

Problems to be Solved by the Invention

However, conventionally, in the case where a virtual world map reflecting a real world map is displayed by converting lines and shapes contained in the real world map to vector data in order to generate the virtual world map on the basis of the vector data, it is required to perform an image analysis process for converting the real world map to the vector data and a drawing process for converting the vector data to the virtual world map.

Nevertheless, since the map data of the real world changes day by day, the virtual map information reflecting the real world map is required also to have a real time property. Accordingly, since the virtual world map has to be displayed by performing an image analysis process for fetching the real world map on a real time base and converting the real world map to vector data and a process for converting the vector data to data compatible with a virtual world map and drawing the virtual world on an interactive base, there is concern of a processing load resulting in a processing delay in displaying images and an impaired real time property.

It is therefore an object of the present invention to provide a game image processing system and a program therefor for a game system which performs various event processes to progress a game in a virtual world where characters corresponding to users and other objects move, wherein the operability of switching a map display between the real world and a virtual world is improved, and real world map data is converted to a virtual world map and displayed at a high speed to improve the acceleration and accuracy of the image displaying process.

Means to Solve the Problems (1) Game Image Processing System

In order to accomplish the object as described above, the present invention is characterized by a game system which invokes various event processes to progress a game in a virtual world which is built on the basis of a map of a real world and in which a character corresponding to a user and other objects move on the basis of the positional information of the real world, comprising:

a game progress processing unit which progresses the game by invoking the various event processes;

a real map storage unit which stores real map information containing geographical information in a real world;

a virtual map information generation unit which generates virtual map information including coordinate information of the objects on virtual geographical information corresponding to the geographical information on the real map information in accordance with a game progress by the game progress processing unit;

a positional information acquisition unit which selects a coordinate position in the real world;

a real display data generation unit which generates real display data indicating the coordinate position selected by the positional information acquisition unit on the real map information on the basis of the coordinate position;

a virtual display data generation unit which generates virtual display data showing the character on the virtual map information corresponding to the coordinate position acquired by the positional information acquisition unit on the basis of the coordinate position; and a display control unit which displays both or selected one of the virtual display data generated by the virtual display data generation unit and the real display data generated by the real display data generation unit, or displays part of either one overlapping the other.

(2) Game Image Processing Program

On the other hand, the present invention is characterized also by a game image processing program for use in a game system which performs various event processes to progress a game in a virtual world where a character corresponding to a user and other objects move, and for causing a mobile terminal device used by the user to function as: a game progress processing unit which progresses the game by invoking the various event processes;

a real map storage unit which stores real map information containing geographical information in a real world;

a virtual map information generation unit which generates virtual map information including coordinate information of the objects on virtual geographical information corresponding to the geographical information on the real map information in accordance with a game progress by the game progress processing unit;

a positional information acquisition unit which selects a coordinate position in the real world;

a real display data generation unit which generates real display data indicating the coordinate position selected by the positional information acquisition unit on the real map information on the basis of the coordinate position;

a virtual display data generation unit which generates virtual display data showing the character on the virtual map information corresponding to the coordinate position acquired by the positional information acquisition unit on the basis of the coordinate position; and a display control unit which displays both or selected one of the virtual display data generated by the virtual display data generation unit and the real display data generated by the display data generation unit.

Incidentally, the system as described above in accordance with the present embodiment and the control method for use in this system can be implemented in a computer by running a program of the present invention described in a predetermined language. Namely, the system having the functionality as described above can be implemented by installing the program of the present invention in an IC chip or a memory device of a mobile terminal device, a smartphone, a wearable terminal, a mobile PC, another type information processing terminal, or a general purpose computer such as a personal computer or a server computer, and running the program on the CPU.

Also, the program of the present invention can be distributed, for example, through a communication line, or as a package application which can be run on a stand-alone computer by storing the program in a computer readable storage medium. Such a storage medium includes a magnetic recording medium such as a flexible disk or a cassette tape, an optical disc such as CD-ROM or DVD-ROM, a RAM card and a variety of storage mediums. In addition, in accordance with the computer readable medium in which this program is stored, the above system and method can be easily implemented with a general purpose computer or a dedicated computer, and the program can be easily maintained, transported and installed.

(3) Respective Configurations

In the case of the above invention, the positional information acquisition unit can acquire the current position of a user, and select the acquired current position of the user as the coordinate position.

In the case of the above invention, the virtual map information generation unit can generate a contour generation image in which a boundary line is blurred in the real map information by blurring the image of the real map information, generate a contour line extraction image from a difference between the contour generation image and the real map information, and generate the virtual map information on the basis of this contour line extraction image.

In the case of the above invention, the virtual map information generation unit can coaxially arrange a plurality of low resolution maps having stepwise reduced scales and increased areas around a detailed map having a greater scale in a predetermined coordinate position as a center, and perform a fade process at a boundary area between the detailed map and the low resolution map and a boundary area between one and another of the low resolution maps to gradually transition one image to the other image.

In the case of the above invention, the virtual map information generation unit can generate a gradation image in which a boundary line is stepwise blurred in the real map information by blurring the image of the real map information, extract an area having a predetermined density in this gradation image, and arrange predetermined objects on the extracted area as an object arrangeable area.

In the case of the above invention, the display control unit can change the display of the real display data and/or the virtual display data or the operation of displaying the same in accordance with the progress of the game by the game progress processing unit.

Effects of the Invention

As has been discussed above, in accordance with the present invention, it is possible to convert real world map data to a virtual world map and display the data at a high speed and improve the acceleration and accuracy of the image displaying process in a game system which performs various event processes to progress a game in a virtual world where a character corresponding to a user and other objects move.

BRIEF DESCRIPTION OF THE DRAWINGS

FIG. 9A, FIG. 9B and FIG. 9C are explanatory views for showing a modification example (for switching by a swipe operation) of the display control in accordance with the embodiment.

FIG. 12 is an explanatory view for showing real map information which is handled by the contour line extraction process in accordance with the embodiment.

FIG. 13A, FIG. 13B and FIG. 13C are explanatory views for showing a blurring process in a gradation process in accordance with the embodiment.

FIG. 14 is an explanatory view for showing a contour generation image in accordance with the embodiment.

DETAILED DESCRIPTION OF THE INVENTION

In what follows, with reference to the accompanying drawings, an embodiment of a game image processing system and a program in accordance with the present invention will be explained in detail.

(Configuration of Game System)

Figure 1:
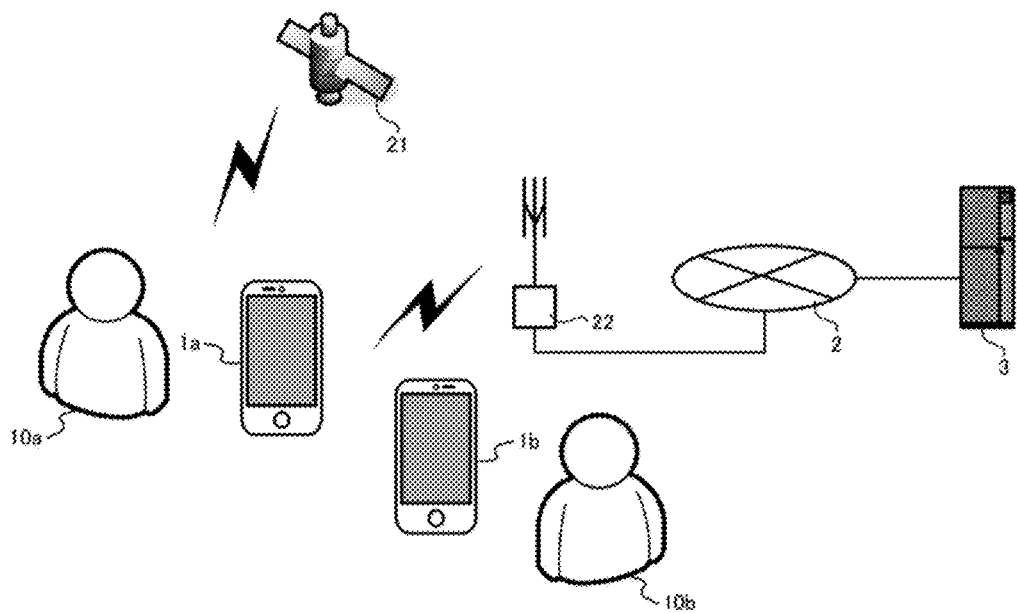
FIG. 1 is a schematic representation showing the overall configuration of a game system in accordance with an embodiment.

FIG. 1 is a schematic representation showing the overall configuration of a game system in accordance with the present embodiment. The game system of the present embodiment consists mainly of smartphones 1 (1a and 1b) which are mobile terminal devices used by a plurality of users 10a and 10b and a game server 3 which is installed on the Internet 2 as illustrated in FIG. 1. Meanwhile, in the case of the present embodiment, the smartphone 1 is explained as an example of a mobile terminal device.

The game server 3 is, in the case of the present embodiment, a server which performs a game progress process, and can be implemented with a single server device or a group of a plurality of servers to virtually build a plurality of function modules on a CPU so that processes are performed by cooperation of the function modules. In addition, this game server 3 can perform data transmission and reception through Internet by communication functionality, and can perform displaying a Web page through a browser software by Web server functionality.

The smartphone 1 is an information processing terminal device making use of wireless communication and serves as a cellular phone to wirelessly communicate with a relay point such as a wireless base station 22 to receive a communication service such as telephone conversation, data communication or the like while moving. The communication system for this cellular phone may be, for example, the 3G (3rd. Generation) system, the 4G system, the FDMA system, the TDMA system, the CDMA system, the WCDMA system or the PHS (Personal Handyphone System). Also, this smartphone 1 is implemented with various functions such as a digital camera function, an application software execution function, a positional information acquisition function utilizing GPS (Global Positioning System), and a mobile computer such as a tablet PC may be used instead.

The positional information acquisition function is a function for acquiring and recording positional information indicating the position of own device. For example, as illustrated in FIG. 1, this positional information acquisition function may detect the position of own device by the use of signals from a satellite 21, the intensity of radio waves from a wireless base station 22 for cellular phones, an access point of Wifi communication or the like.

Then, this smartphone 1 is provided with a liquid crystal display as a display unit for displaying information, and also provided with an operation device such as an operation button through which a user can perform input operation. This operation device also includes a touch panel which is arranged overlaid on the liquid crystal display as an input unit through which an operation signal is acquired in response to a touch operation pointing a coordinate position on the liquid crystal display and so forth. More specifically, this touch panel is an input device for inputting an operation signal through a pressure, a static electricity or the like in response to a touch operation with a user's finger, a pen or the like, and includes a liquid crystal display for displaying graphics and a touch sensor overlaid on the liquid crystal display to accept an operation signal in correspondence with an coordinate position in the graphics displayed on this liquid crystal display.

(Internal Configuration of Each Device)

Figure 3:
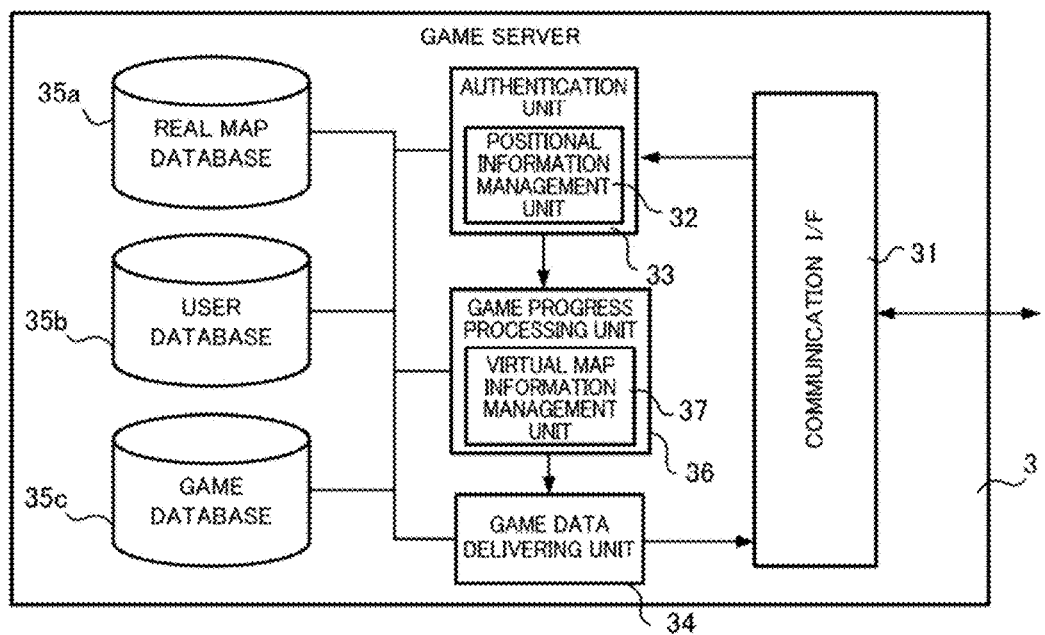
FIG. 3 is a block diagram for showing the internal configuration of the game server 3 in accordance with the embodiment.
Figure 4:
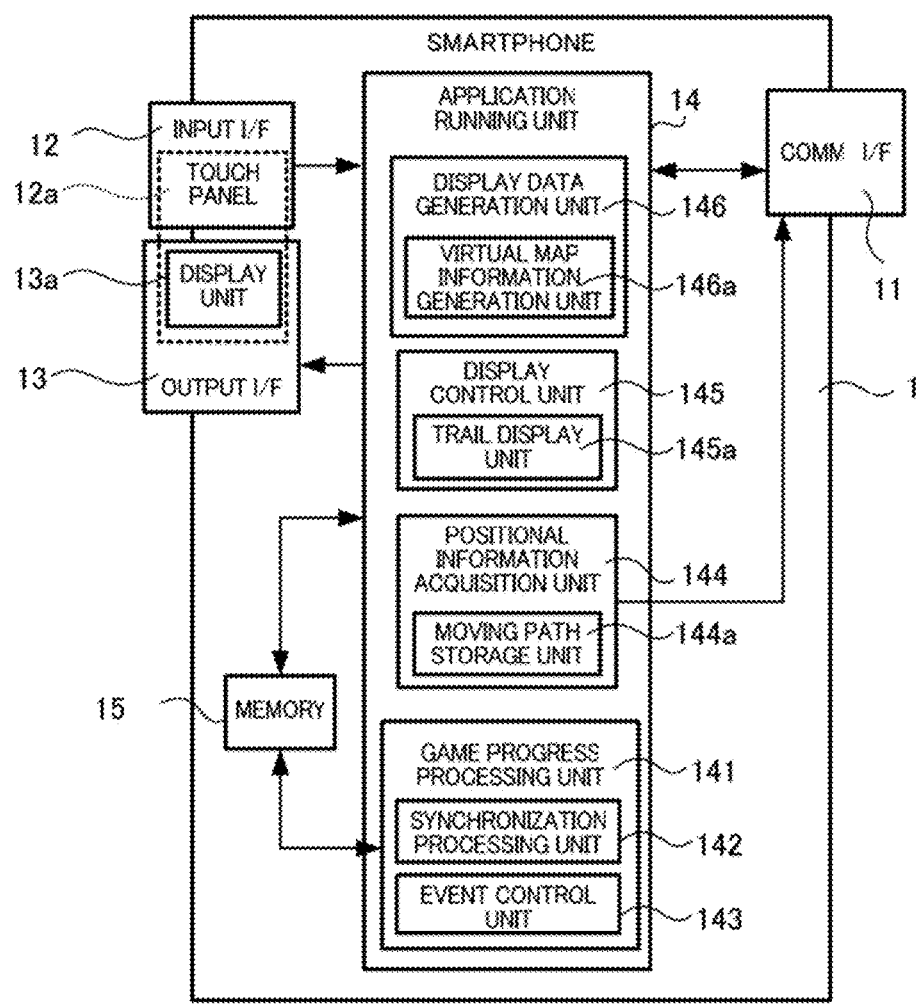
FIG. 4 is a block diagram for showing the internal configuration of a smartphone 1 in accordance with the embodiment.
Figure 5:
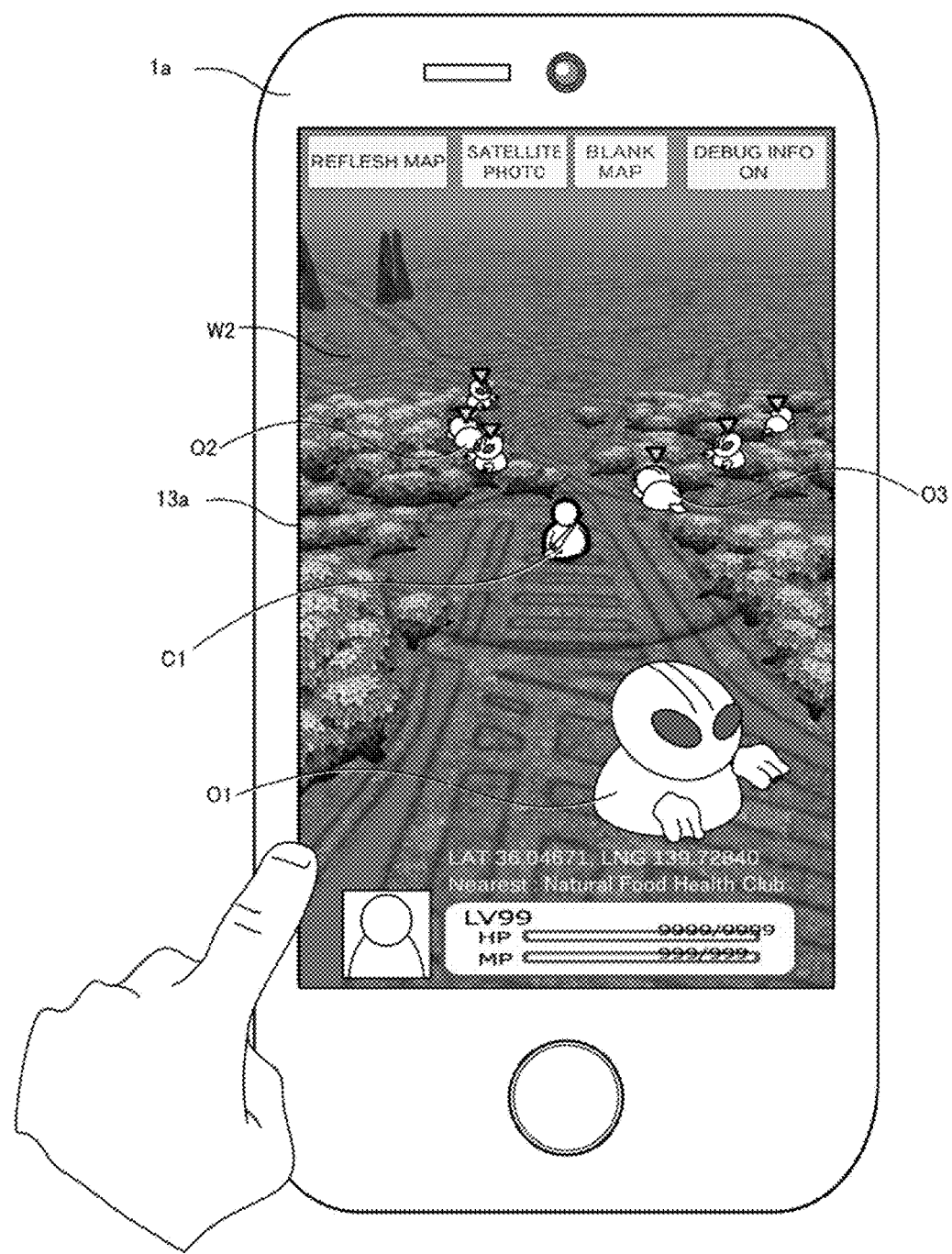
FIG. 5 is an explanatory view for showing the state of a virtual world displayed by the display control in accordance with the embodiment.
Figure 6:
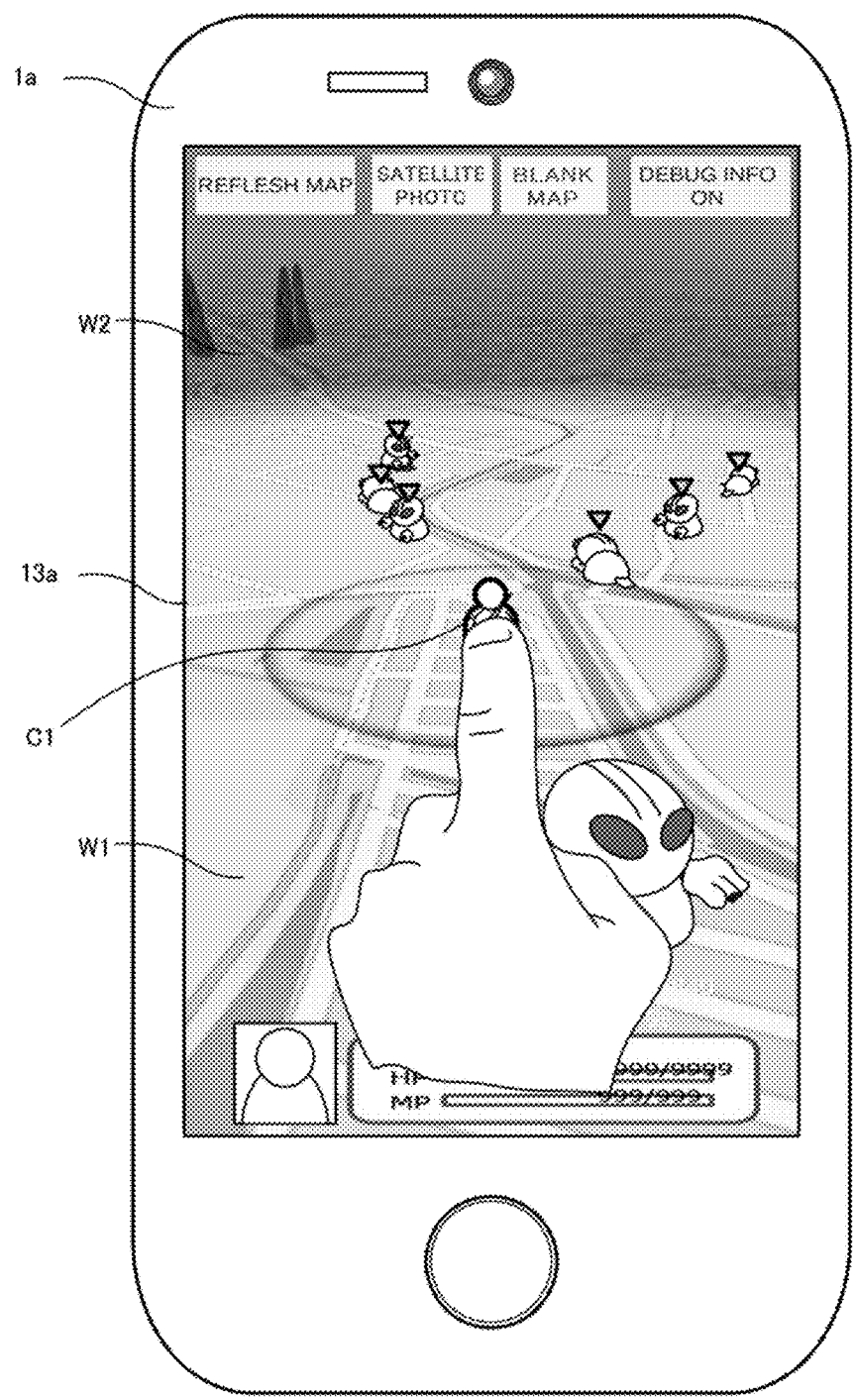
FIG. 6 is an explanatory view for showing the state of a virtual world, on which a real world is superimposed, displayed by the display control in accordance with the embodiment.

Next is an explanation of the internal configuration of each device constituting the game system as described above. FIG. 3 is a block diagram for showing the internal configuration of the game server 3 in accordance with the present embodiment. FIG. 4 is a block diagram for showing the internal configuration of the smartphone 1 in accordance with the present embodiment. Incidentally, the term "module" used in the following explanation stands for a function unit capable of performing a predetermined operation and implemented with hardware such as a device or apparatus, software capable of performing the functionality as required, or a combination thereof.

(1) Game Server

First, the internal configuration of the game server 3 will be explained. The game server 3 is a server device which is installed on the Internet 2 to perform data transmission and reception with each smartphone 1 through the Internet 2.

The game server 3 is provided with a communication interface 31 for performing data communication through the Internet 2, an authentication unit 33 for authenticating the authority of a user terminal or a user, a positional information management unit 32 for collecting and managing the positional information of each user terminal, a game progress processing unit 36 for performing a process for the overall game progress and a process for the game progress of each user, a virtual map information management unit 37 for generating virtual map information, a game data delivering unit 34 for delivering game data to each user, and a various database group.

The database group includes a real map database 35a as a real map storage unit for storing real map information containing geographical information in the real world, a user database 35b, and a game database 35c for accumulating virtual map information and information about the process for the overall game progress and the process for the game progress of each user. Each of these database may be an independent database, or a relational database may be constructed by setting relationships connecting data items to each other of a plurality of divided databases.

The real map database 35a is a storage device which stores real map information including geographical information in the real world, i.e., natural geographical elements such as mountains, valleys and rivers, artifacts such as buildings, roads and railroads, place names, addresses, traffic regulations and the like. Incidentally, this real map database 35a may be a database which is possessed and operated by a service provider who operates the game server 3, but may be a map database which is operated by another map service provider.

The information accumulated in the user database 35b includes identifiers (user ID, terminal ID) which identifies users or mobile terminal devices used by the users, authentication information associated with passwords and the like, personal information of the users associated with user IDs, and the model name of each terminal device. The user database 35b accumulates an authentication history (access history) of each user or each user terminal, information about the game progress of each user (current position such as degrees of latitude and longitude, status, score, usage history and the like of a game) with relationships to the game database 35c, and settlement information about the game progress.

The information accumulated in the game database 35c includes, as game data, the map information of a virtual world, the characteristics of characters and objects, information about event process, graphics information and the like, and also includes mapping information for associating the game data with geographic elements, buildings, roads, railroads and the like contained in a real map.

The authentication unit 33 is a module for establishing a communication session with each smartphone 1 through the communication interface 31 and performing an authentication process for each established communication session. This authentication process is performed to acquire authentication information from the smartphone 1 of the user who is an accessing person, refer to the user database 35b, identify the user and the like, and authenticate the authority thereof. The authentication result (user ID, authentication time, session ID and the like) obtained by this authentication unit 33 is transmitted to the game progress processing unit 36 and accumulated in the user database 35b as an authentication history.

The positional information management unit 32 is a module for acquiring positional information which is acquired by the user terminal device and transmitted to the game server 3. The positional information management unit 32 accumulates, as a usage history, the identifier (user ID, terminal ID or the like) of a user or a user terminal device identified by the authentication process of the authentication unit 33, and the positional information thereof in association with each other in the user database 35b.

The game progress processing unit 36 is a module for generating an event process to progress a game in a virtual world where characters corresponding to users and other objects move to execute a game program including certain rules, logics and algorithms and generate an event process such as a confrontation battle, a mini game, movie reproduction or the like in accordance with a positional relationship (approaching, contacting or the like) among characters and objects. Meanwhile, in the case of the present embodiment, the game progress processing unit 36 cooperates with a game progress processing unit 141 provided in the smartphone 1 in order that, while part of the game progress process is performed in the game server 3, part of the graphic process and the event process is performed in the game progress processing unit 141 of the smartphone 1. For example, the event process that may be invoked is predicted in the game server 3 side on the basis of the positions of the characters of other users and the positions of objects to generate the invocation condition of the event process in the game server 3, and the invocation condition is transmitted to the smartphone 1 so that the event process is actually invoked in the smartphone 1 which performs the graphic process required for the event process on the basis of the invocation condition which is received from the game server 3.

Figure 2:
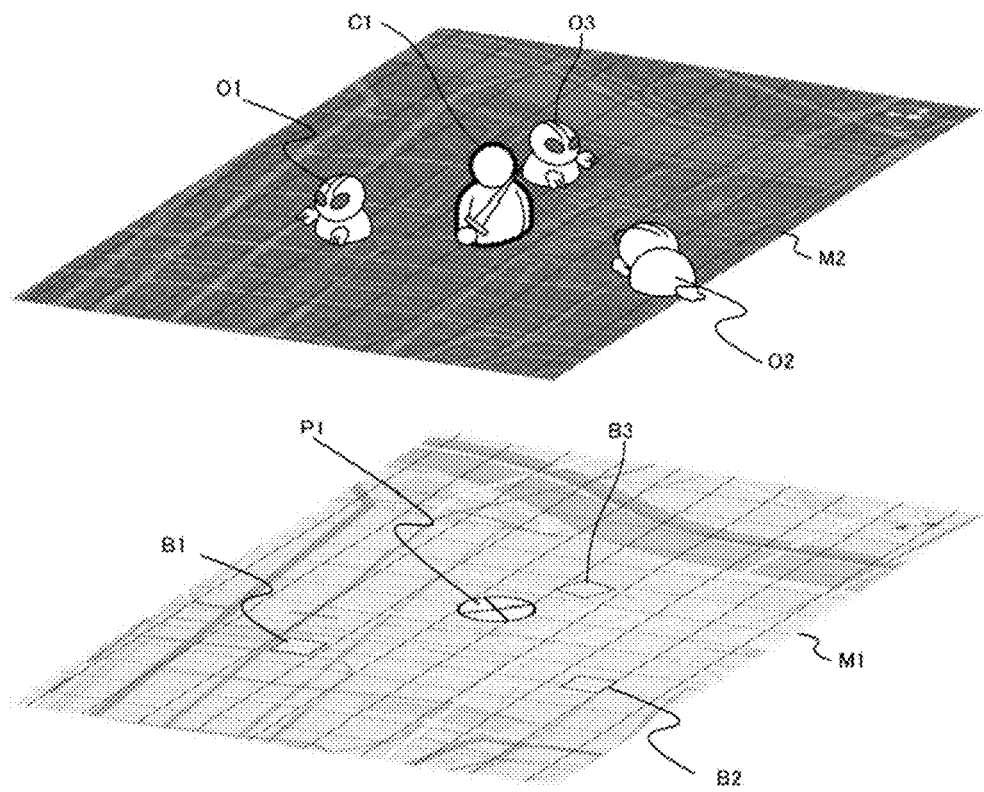
FIG. 2 is an explanatory view for showing the relationship between real map information M1 and virtual map information M2 in accordance with the embodiment.

The virtual map information management unit 37 is a module for managing and controlling the generation, accumulation and delivery of virtual map information M2 including the coordinate information of the character of another user, objects O1 to O3 and the like on the virtual geographical information corresponding to the geographical information of real map information M1 as illustrated in FIG. 2 in accordance with the game progress by the game progress processing unit 36. This virtual map information M2 may be generated in the game server 3 side, in the smartphone 1 side or by the cooperation of the game server 3 and the smartphone 1. The virtual map information management unit 37 manages the virtual map information M2 generated by or accumulated in the game server 3 side and the virtual map information M2 generated by or accumulated in the smartphone 1 side, compares these two pieces of the virtual map information M2, and if necessary, synchronizes these two pieces by delivering all or part of the virtual map information M2 to the smartphone 1 side.

Meanwhile, in the case where the virtual map information M2 is generated in the game server 3 side, the virtual map information management unit 37 acquires geographic elements, buildings, roads, railroads and the like contained in the real map information M1 which is accumulated in the real map database 35a, refers to mapping data accumulated in the game database 35c, and generate the virtual world map information on the basis of the virtual map information corresponding to the real map information M1, the characteristics (properties) of characters and objects, information about event processes, graphic information and the like. In this case, the objects O1 to O3 are arranged in the coordinate positions (coordinate areas) corresponding to the buildings B1 to B3 on the real map information M1.

The game data delivering unit 34 is a module for delivering map information and graphics in the virtual world through the communication interface 31 in order to synchronize the virtual map information M2 generated by the virtual map information management unit 37 in accordance with control by the virtual map information management unit 37 on the basis of the current position of the user.

(2) Smartphone 1

Next is an explanation of the internal configuration of the smartphone 1. As illustrated in FIG. 4, the smartphone 1 is provided with a communication interface 11, an input interface 12, an output interface 13, an application running unit 14 and a memory 15.

The communication interface 11 is a communication interface for performing data communication, and provided with the functions to perform contactless communication such as wireless communication and contact (wired) communication with a cable, adapter means or the like. The input interface 12 is a device such as a mouse, a keyboard, an operation button, a touch panel 12a and the like for inputting user operation. On the other hand, the output interface 13 is a device such as a display, a speaker and the like for outputting images and sounds. Particularly, this output interface 13 includes a display unit 13a such as a liquid crystal display on which the touch panel 12a is placed as the input interface.

The memory 15 is a storage device which stores an OS (Operating System), firmware, programs for various applications and other data, and accumulates user IDs for identifying users and game application data downloaded from the game server 3 together with game data and the like processed by the application running unit 14. Particularly, in the case of the present embodiment, the memory 15 stores the virtual map information M2 and the real map information M1 acquired from the game server 3.

The application running unit 14 is a module for running a general OS and applications such as game applications and browser software, and usually implemented with a CPU and the like. This application running unit 14 virtually builds the game progress processing unit 141, a synchronization processing unit 142, an event control unit 143, a display data generation unit 146, a display control unit 145 and a positional information acquisition unit 144 by running the game program in accordance with the present invention.

The game progress processing unit 141 is a module for progressing a game by moving each character corresponding to each user, monsters and other objects in the virtual world to invoke various event processes such as a confrontation battle, a mini game, movie reproduction and the like in accordance with a positional relationship (approaching, contacting or the like) among characters and objects in synchronization with the game progress processing unit 36 in the game server 3 side through the synchronization processing unit 142.

In the case of the present embodiment, the game progress processing unit 141 cooperates with the game progress processing unit 141 of the game server 3 such that while part of the game progress process is performed in the game server 3, part of the graphic process and the event process is performed in the game progress processing unit 141 of the smartphone 1. For example, event invocation conditions are generated in the game server 3, and transmitted to the smartphone 1 in which the event process is actually invoked while the smartphone 1 performs the graphic process required for the event process.

The synchronization processing unit 142 is a module for synchronizing the game progress process in the smartphone 1 side with the game progress process in the game server 3 side. Specifically, the event process that may be invoked is predicted in the game server 3 side on the basis of the positions of the characters of other users and the positions of objects to generate the invocation condition of the event process in the game server 3, and the invocation condition is transmitted to the smartphone 1 and received by the synchronization processing unit 142 so that the event process is actually invoked by the game progress processing unit 141 of the smartphone 1 which performs the graphic process required for the event process on the basis of the invocation condition which is received from the game server 3. The results (winning/losing, score and the like of battle or mini game) of the event process performed by the game progress processing unit 141 in the smartphone 1 side are notified to the game progress processing unit 141 in the game server 3 side through the synchronization processing unit 142 and reflected in the subsequent game progress process.

On the other hand, the event control unit 143 is a module for monitoring the event process invoked by the game progress processing unit 141 and the moving speed of the current position of own device acquired by the positional information acquisition unit 144, and suspending a predetermined suspendable event process when the moving speed of the current position is no lower than a predetermined value and when the event process invoked by the game progress processing unit 141 is the suspendable event process. The game progress processing unit 141 can progress the game by invoking another event process while suspending the event process to be suspended. The synchronization processing unit 142 notifies the game progress processing unit 141 in the game server 3 side of the event process suspended by the event control unit 143 to report to the game server 3 that the game is progressed while suspending the event process which satisfies the invocation condition of the event process.

The positional information acquisition unit 144 is a module for selecting and acquiring coordinate positions in the real world to acquire the current position of the user and the current positions of other users by a global positioning system (GPS), a base station positioning system using triangulation on the basis of the intensities of radio waves transmitted from base stations and information about the base stations, a wifi positioning system using a database of wifi SSID (Service SetID), the degrees of latitude and longitude and the radio wave condition in combination, or the like.

Also, this positional information acquisition unit 144 can acquire positional information and measure a moving speed by selecting an arbitrary coordinate position on the basis of a user operation or event invocation according to the game progress. Furthermore, the positional information acquisition unit 144 has a function to acquire the coordinate position of an arbitrary object, and can acquire the current coordinate position, the coordinate position in the virtual map, and the displacement history thereof by searching the databases 35a to 35c.

Particularly, the coordinate position of this arbitrary object can be acquired by retrieving, from the databases 35a to 35c, the position in which an object to be a proxy of the user is arbitrarily set on the real map information or the virtual map information as a proxy object. The position of this proxy object on the map information is automatically moved by the game progress processing unit 36 or 141 in accordance with the progress of the game or in synchronization with the current position of a specified user.

In the case of the present embodiment, the positional information acquisition unit 144 is provided with a moving path recording unit 144a which is a module for calculating and recording moving paths and moving speeds on the basis of the displacement history of each user or object obtained with reference to the current position of the user, the current positions of other users, the coordinate positions of arbitrary objects and the like as acquired by the positional information acquisition unit 144. This moving path recording unit 144*a* can calculate the moving path by, for example, connecting each adjacent points of sampled positions with the shortest line in time-series order to determine the moving path or referring to the geographical information to determine the path along the course between two points.

The display data generation unit 146 is a module for generating display data to be displayed on the display unit 13*a*. The display data is data which is generated by combining graphics data with image data, character data, video data, sound or other type data. Particularly, the display data generation unit 146 according to the present embodiment functions as a real display data generation unit which generates real display data indicating the current position of the user on the real map information M1 on the basis of the current position of the user acquired by the positional information acquisition unit 144, and a virtual display data generation unit which generates virtual display data for showing a character on the virtual map information M2 corresponding to the current position of the user on the basis of the current position acquired by the positional information acquisition unit 144. The display control unit 145 controls the process of displaying the display data generated by this display data generation unit 146.

This display data generation unit 146 is provided with a virtual map information generation unit 146*a* which is a module for generating the virtual map information M2 including the coordinate information of the characters of other users and the objects O1 to O3 on the virtual geographical information corresponding to the geographical information on the real map information M1 as illustrated in FIG. 2 in accordance with the game progress by the game progress processing unit 141. The virtual map information generation unit 146*a* acquires geographic elements, buildings, roads, railroads and the like contained in the real map information M1 accumulated in the real map database 35*a* in the memory 15 or on a network, and generates virtual world map information on the basis of the virtual world map information corresponding to corresponding to the real map information M1, the characteristics of characters and objects, information about event process, graphics information and the like by referring to mapping data accumulated in the memory 15 and the game database 35*c*. In the case of the example shown in FIG. 2, the objects O1 to O3 are arranged in the coordinate positions (coordinate areas) corresponding to the buildings B1 to B3 on the real map information M1.

Incidentally, while the virtual map information M2 is generated by the virtual map information generation unit 146*a* of the smartphone 1 in the case of the present embodiment, the virtual map information M2 corresponding to the geographical information of the real map information M1 can be generated by the virtual map information management unit 37 of the game server 3 in advance or on a real time base, followed by delivering the virtual map information M2 to each smartphone 1 by the game data delivering unit 34 to achieve synchronization.

The display control unit 145 is a module for controlling the display unit 13*a* to display both or selected one of the virtual display data and the real display data generated by the display data generation unit 146, or display part of either one overlapping the other, and also display a trail by a trail display unit 145*a* in addition. The display unit 13*a* is controlled by this display control unit 145 to display the real display data and the virtual display data together with the trail by the trail display unit 145*a*.

More specifically, the display control unit 145 according to the present embodiment is provided with the trail display unit 145*a*. This trail display unit 145*a* is a module for displaying, as trails, the moving path of the user recorded by the moving path recording unit 144*a*, the moving paths of other users and the moving paths of arbitrary objects on the real map information M1 or the virtual map information M2. This trail display unit 145*a* displays a trail by for example coloring, with a certain width, the moving path determined by connecting each adjacent points of sampled positions with the shortest line in time-series order or referring to the geographical information to determine the path along the course between two points and coloring the determined path with a certain width. Furthermore, this trail display unit 145*a* displays a trail by coloring, as part of the trail, an area or an object in a neighbourhood of the moving path of each user or object on the real map information M1 or the virtual map information M2.

This area may be displayed by coloring a block as a unit such as an administrative division, a town division, a prefecture, a municipality or the like defined on the basis of the actual geographical information or the virtual geographical information. This block unit coloring may be performed by coloring a block abutting onto the moving path determined by connecting each adjacent points with the shortest line in time-series order or a block abutting onto the moving path determined along the course between two points with reference to the geographical information.

(Display Control by Game Image Processing System and Game Image Processing Program)

Next is an explanation of the display control by a game image processing system and a game image processing program in accordance with the present invention. FIGS. 5 to 9C are explanatory views for showing the display control in accordance with the present embodiment.

Figure 7:
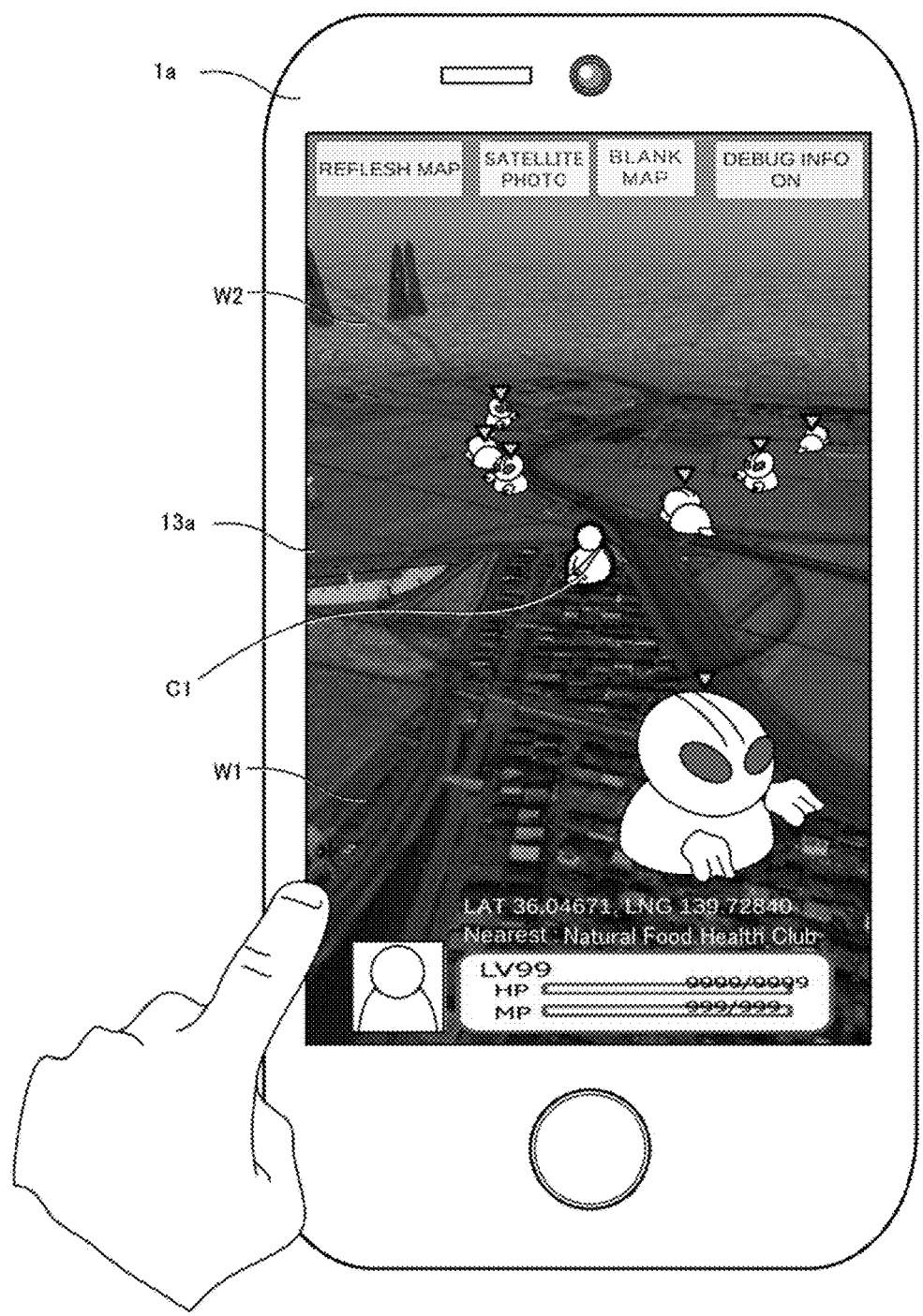
FIG. 7 is an explanatory view for showing the state of a virtual world, on which a satellite photograph of a real world is superimposed, displayed by the display control in accordance with the embodiment.

The trail display unit 145 as described above changes the display of real display data W1 and virtual display data W2 in accordance with the coordinate position designated by an operation signal acquired through the touch panel 12*a* or movement of this coordinate position. Specifically, in the case of the game system according to the present embodiment, a virtual world is built by the virtual map information M2 constructed on the basis of the real map information M1 with virtual display data W2 displayed to represent the virtual world in 3D on the display unit 13*a* of the smartphone 1 as illustrated in FIG. 7. This virtual display data W2 includes a character C1 representing the user himself displayed in the center of the screen, and the objects O1 to O3 such as monsters displayed as if they are wondering around the user. As illustrated in FIG. 2, these objects O1 to O3 are arranged in the coordinate positions (coordinate areas) corresponding to the buildings B1 to B3 on the real map information M1 as if they are wondering.

Figure 8A:
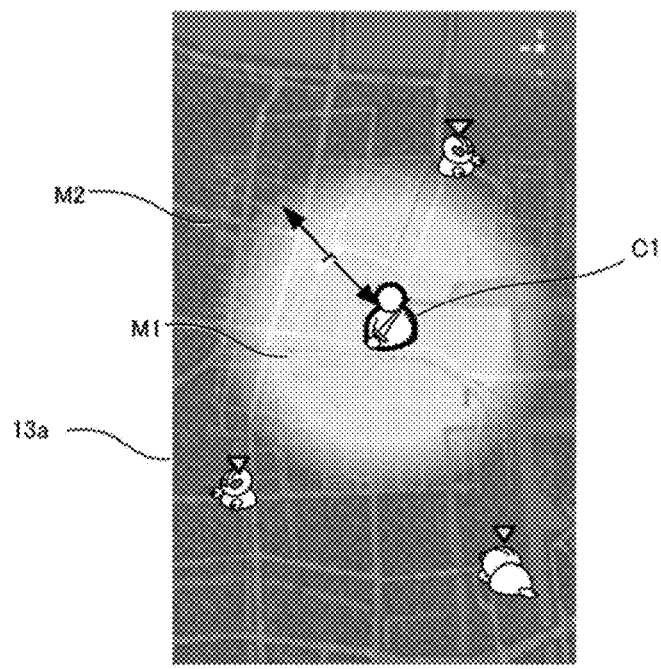
FIG. 8A and FIG. 8B are explanatory views for showing a modification example of the display control in accordance with the embodiment.
Figure 8B:
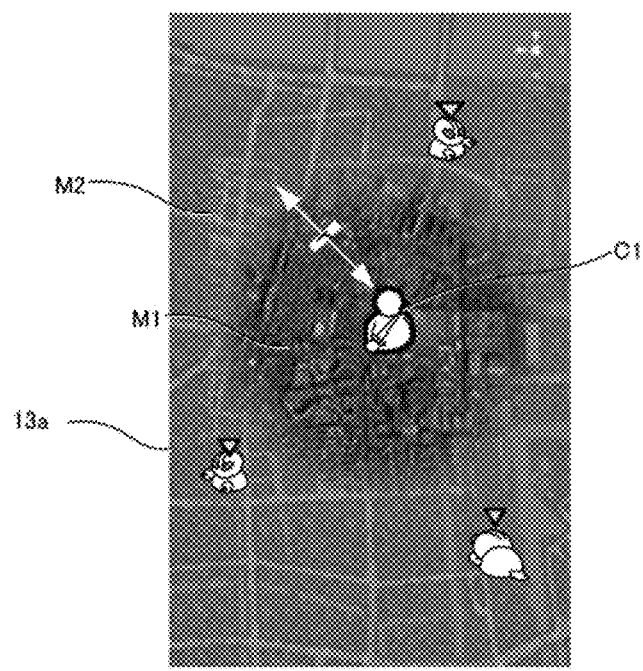

The touch panel 12*a* can be used to perform magnification/reduction or moving a camera viewpoint by tapping or swiping with a finger. In addition to this, it is possible to display both or selected one of the virtual display data W1 and the real display data W2, or display part of either one overlapping the other by performing a predetermined gesture operation on the touch panel 12*a*. Specifically, by pressing the character C1 for a long time (about two seconds) on the virtual display data W2 displayed as illustrated in FIG. 7, the real display data W1 is displayed in a partially superimposed manner as illustrated in FIG. 8A and FIG. 8B within a circular area around the character C1 representing the current position of the user himself. This partial real display data W1 which is displayed in a superimposed manner can be removed by releasing the finger from the screen to resume the original display only with the virtual display data W2. Also, this real display data W1 can be composed of a satellite photograph as illustrated in FIG. 9A through FIG. 9C.

Furthermore, the display control unit 145 of the present embodiment is provided with a function to change the display of the real display data W1 and the virtual display data W2 or the operation of displaying the same in accordance with the progress of the game by the game progress processing unit 141. For example, as illustrated in FIG. 8A and FIG. 8B, the display control unit 145 changes the radius r of the circular area in which the real display data W1 is partially superimposed around the character C1 in accordance with the progress of the game. For example, in the case where the user is a person who is unfamiliar with operations, the radius r is increased, and then controlled to be decreased as the game is progressed and the difficulty of the game is raised. Also, while the radius r may be increased when it is detected that the smartphone 1 is moving, the radius r may be decreased when it is detected that the smartphone 1 is stopped.

Furthermore, as an example of an operation of switching the display between the virtual display data W2 and the real display data W1, the touch contact point can be moved from one edge of the screen toward the other edge as illustrated in FIG. 9 by so-called swipe operation to switch between the virtual display data W2 and the real display data W1 in order that the screen transits from FIG. 9A to FIG. 9C to introduce an animation effect as if a page is turned up. In this case, the swipe operation in the reverse direction may be used to return to the previous virtual display data W2 from FIG. 9C to FIG. 9A.

In accordance with the present embodiment, the entertainment property of the game can be improved by introducing the simple operation of switching the map display between the real world and the virtual world to improve the operability and partially superimposing the real world map on the virtual world map.

(Generation Process of Virtual Display Data)

The process of generating virtual map information by the display data generation unit 146 as described above will be explained. As has been discussed above, the display data generation unit 146 generates virtual map information corresponding to geographical information on the real map information in accordance with the game progressed by the game progress processing unit 36 or 141, and arranges objects on the map on the basis of the coordinate information of the virtual map information. In the case of the present embodiment, geographical information is generated as a base of virtual map information by extracting, from real map information, the contour lines of roads, rivers, divisions, other buildings and the like in the map, and a bird's eye view is displayed to reproduce perspectiveness by combining geographical information in this real map or virtual real map in different scales. This virtual map information is three-dimensionally displayed by arranging objects such as buildings and structures in the virtual real world.

Figure 23:
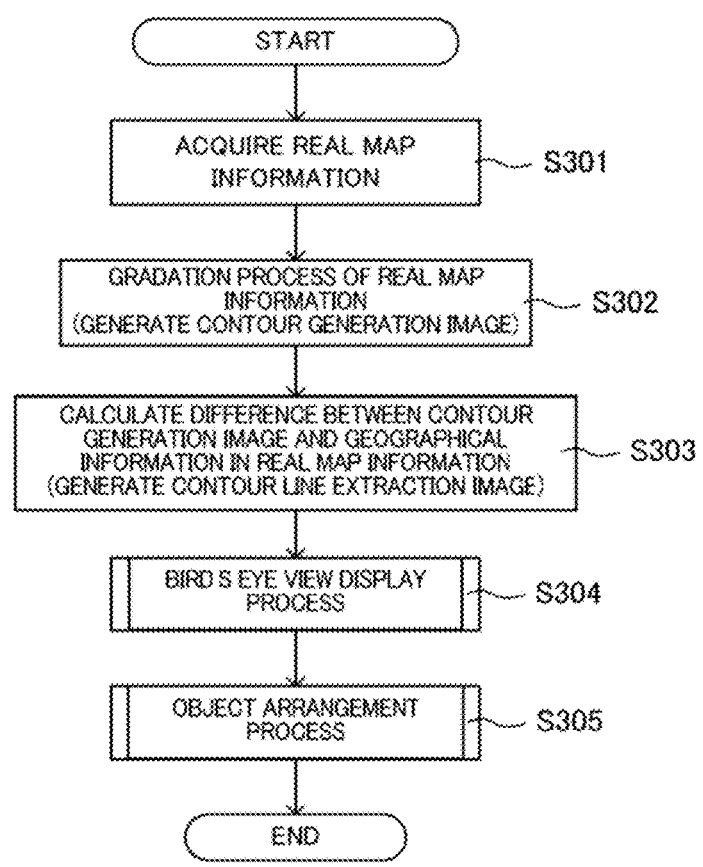
FIG. 23 is a flow chart for showing the procedure of the contour line extraction process in accordance with the embodiment.
Figure 24:
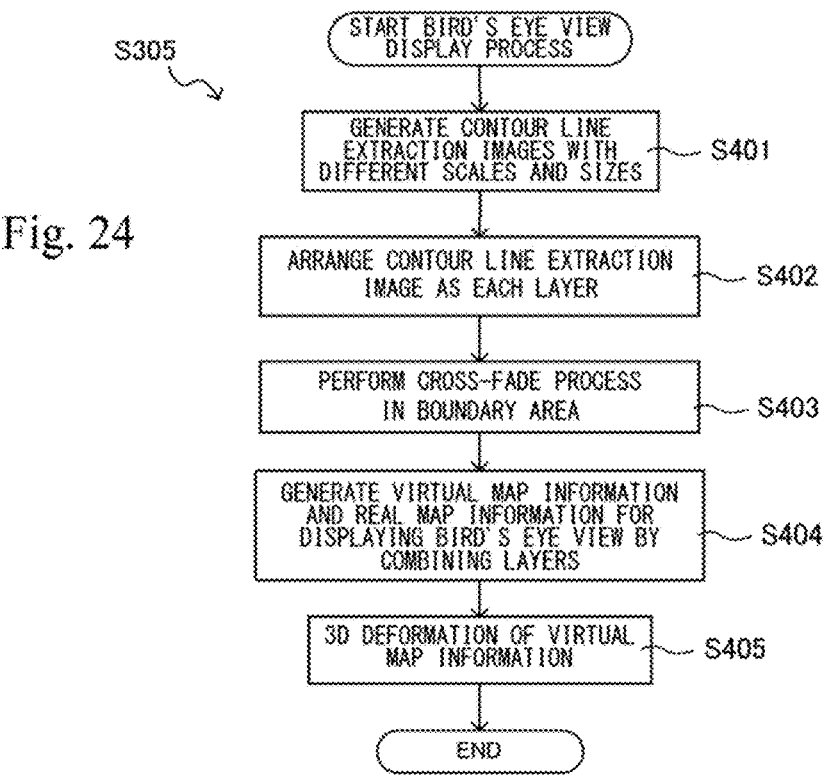
FIG. 24 is a flow chart for showing the procedure of the bird's eye view display process in accordance with the embodiment.
Figure 25:
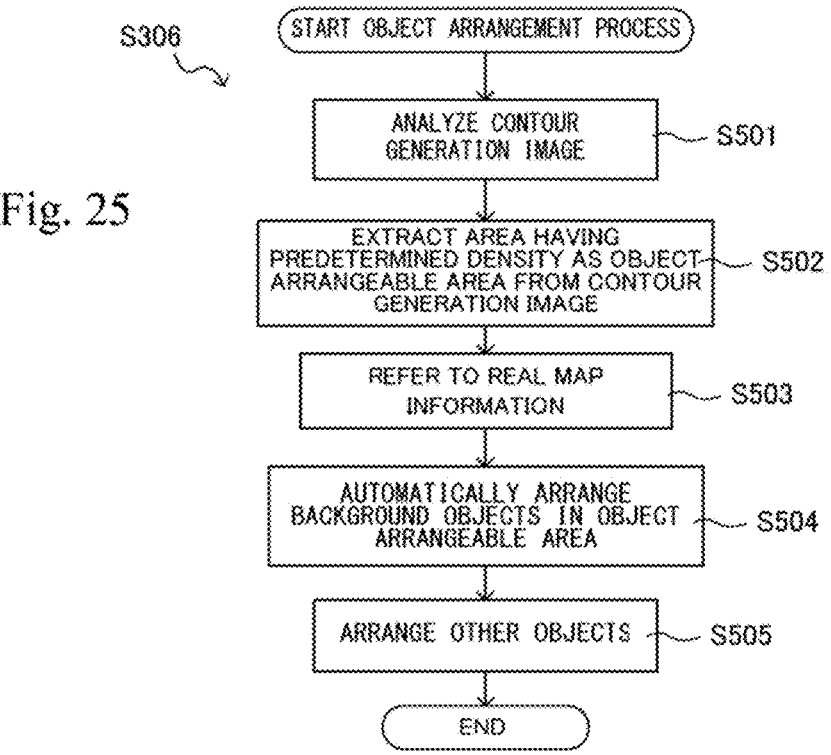
FIG. 25 is a flow chart for showing the procedure of the object arrangement process in accordance with the embodiment.

In what follows, each process will be explained. FIG. 23 is a flow chart for showing the procedure of a contour line extraction process in accordance with the present embodiment. FIG. 24 is a flow chart for showing the procedure of a bird's eye view display process in accordance with the present embodiment. FIG. 25 is a flow chart for showing the procedure of an object arrangement process in accordance with the present embodiment.

(1) Contour Line Extraction Process

First, the procedure of the process of extracting contour lines to be included in virtual map information from real map information with reference to FIG. 12 through FIG. 16 and FIG. 23. Meanwhile, in the following explanation, FIG. 12 is an explanatory view for showing real map information which is handled by the contour line extraction process of the present embodiment. In the case of the example shown in FIG. 12, the real map information M1 contains an area B10 surrounded by roads R1 to R4.

As shown in FIG. 23, first, the display data generation unit 146 acquires the real map information M1 (S301). At this time, the real map information M1 as geographical information in the real world is given either in the form of a map image in a bit map format or in the form of numerical information such as vector or polygon graphics consisting of coordinates, attribute information and the like. In the case where the real map information M1 is given as an image, this image is acquired as it is. Conversely, in the case where the real map information M1 is given as numerical information such as vector or polygon graphics, the numerical information is converted to a map image, such as a bit map, which is then acquired as the real map information M1.

Next, a contour generation image M11 in which boundary lines are blurred in the real map information is generated by performing a gradation process to fade color boundaries (FIG. 14) in the map image of the real map information M1 (S302). This contour generation image M11 includes a gradation formed with areas B10a to B10c whose color is gradually thinned from black in the roads R1 to R4 to white in the area B10 by blurring the boundaries between the area B10 and the roads R1 to R4. This gradation process is performed, for example, by calculating the weighted average of an arbitrary designated picture element E10 in the real map information and eight picture elements E11 surrounding this picture element E10, and coloring these picture elements with the weighted average color to blur the designated picture element E10 and thereabout as illustrated in FIG. 13A through FIG. 13C. By this configuration, near the boundary of different colors, color in a neighbourhood of the designated picture element is blurred, and a gradation of gradually thinning (thickening) color is formed by successively repeating this process for all the picture elements.

Figure 15:
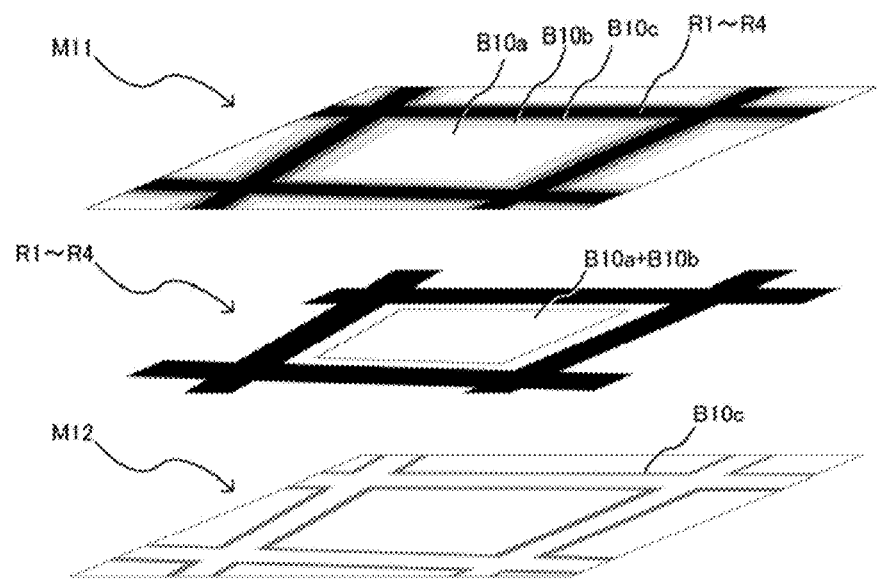
FIG. 15 is an explanatory view for showing the outline of a contour line extraction process in accordance with the embodiment.

Next, as illustrated in FIG. 15, a contour line extraction image M12 is generated from the difference between the contour generation image M11 and the geographical information in the real map information (S303). Specifically, the color boundaries of the contour generation image M11 are blurred and fringed by paler colors than the original geographical information (the area B10 and the roads R1 to R4 in the illustrated example). Because of this, the contour line extraction image M12 is generated by subtracting predetermined color picture elements from the original geographical information in the real map information to extract only the picture elements which are blurred to be fringes. In this case, the contour line extraction image M12 consisting of the contours with which the roads R1 to R4 are fringed is generated by subtracting, of the geographical information in the real map information, the color picture elements of the roads R1 to R4 and the picture elements of the areas B10a+B10b which are somewhat close in color to the original area B10, from the contour generation image M11.

Figure 16:
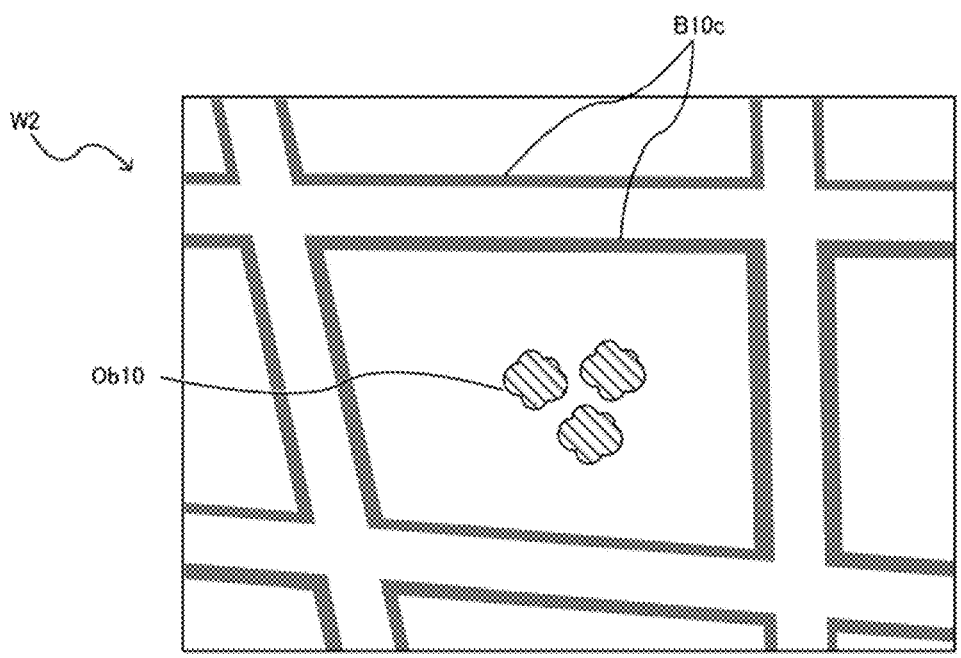
FIG. 16 is an explanatory view for showing virtual map information generated by the contour line extraction process in accordance with the embodiment.
Figure 18:
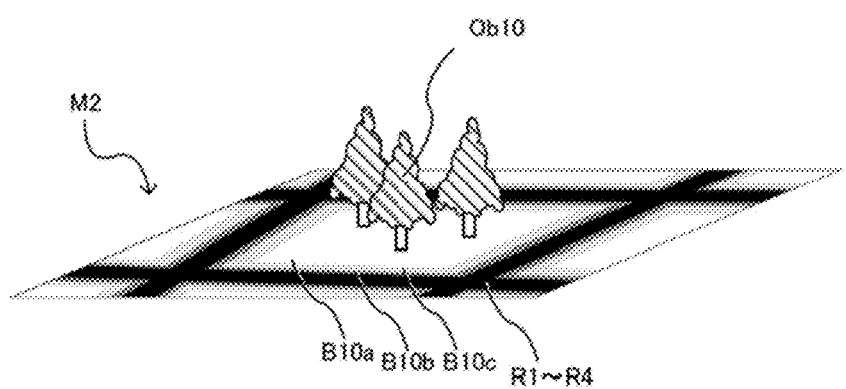
FIG. 18 is an explanatory view for showing virtual map information, which is three-dimensionally displayed, generated by the object arrangement process in accordance with the embodiment.
Figure 19:
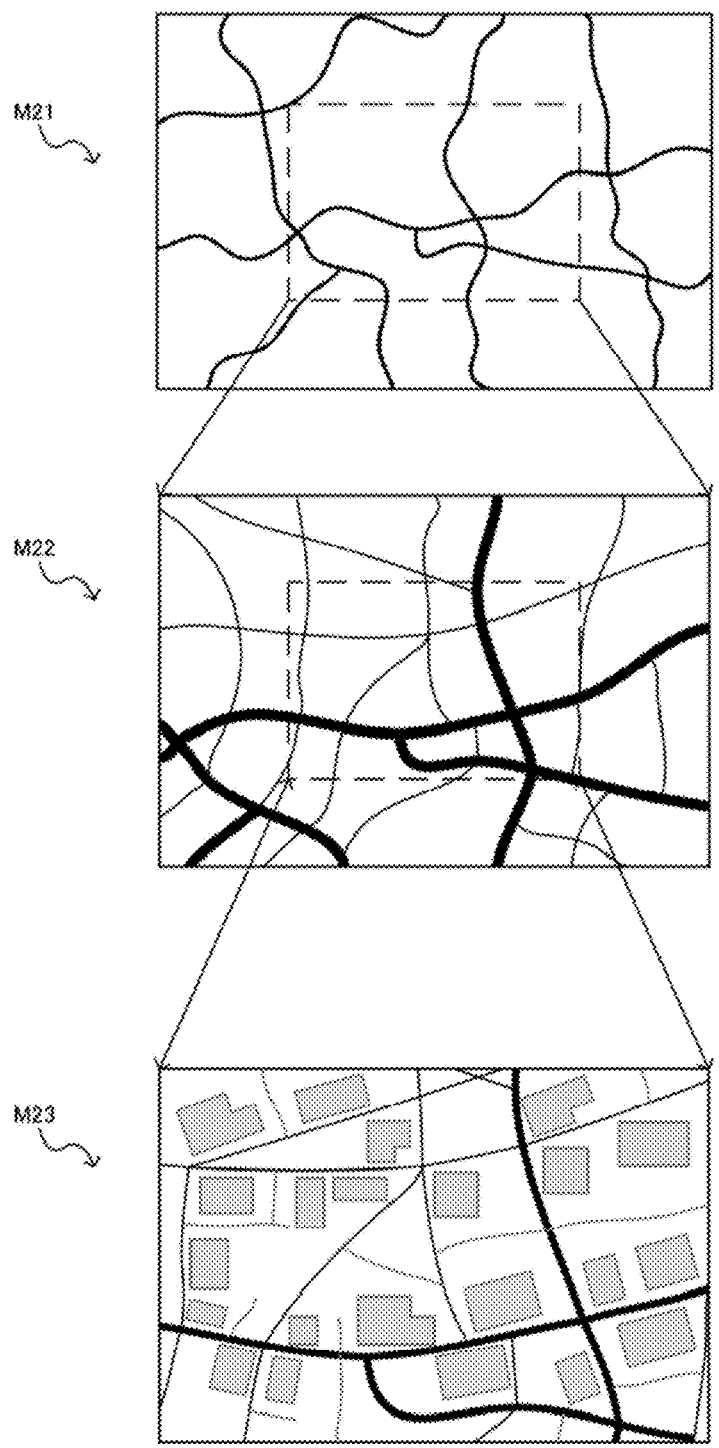
FIG. 19 is an explanatory view for showing the relationship between maps having different scales and combined by a bird's eye view display process in accordance with the embodiment.

Then, the virtual display data W2 as illustrated in FIG. 16 is generated on the basis of the contour line extraction image M12 by generating the virtual display data W2 (S304) for bird's eye view display as illustrated in FIG. 18 and arranging objects Ob10 such as trees and buildings (S305). The arrangement of the objects Ob10 based on the contour line extraction image M12 is performed by making use of the gradation drawn in the contour generation image M11.

(2) Bird's Eye View Display Process

Figure 20:
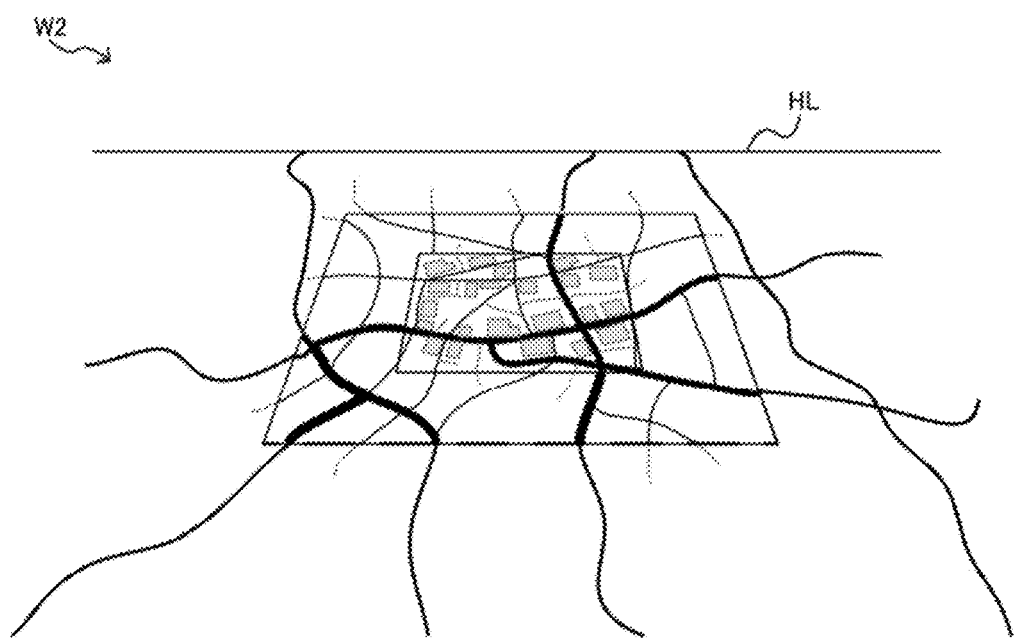
FIG. 20 is an explanatory view for showing virtual map information generated by the bird's eye view display process in accordance with the embodiment.

In the case of the virtual display data W2 for displaying the virtual map information M2 as described above, the direction and depression angle of the map can be three-dimensionally changed as illustrated in the bird's eye view shown in FIG. 20. This bird's eye view is displayed in order that the view can be displayed larger and clearer in the vicinity of the eye position, and becomes blurred in a smaller size as leaving the eye position. Depending upon the depression angle of the bird's eye view display, a horizon HL may be displayed as the display limit of the map.

In the case of the bird's eye view display process according to the present embodiment, the bird's eye view is displayed in order that the scale of the map is decreased to display details of geographical information near the current position of the user in the center of the map, and that the scale of the map is increased to omit the display of the geographical information to lessen the processing load by decreasing the resolution without compromising the functionality of the map to reproduce perspectiveness with reality. FIG. 24 shows the procedure of this contour line extraction process.

First, as shown in FIG. 24, contour line extraction images are generated with different scales and sizes (S401). These contour line extraction images having different scales and sizes can be generated by performing the above contour line extraction process with the real map information having different scales.

Figure 21:
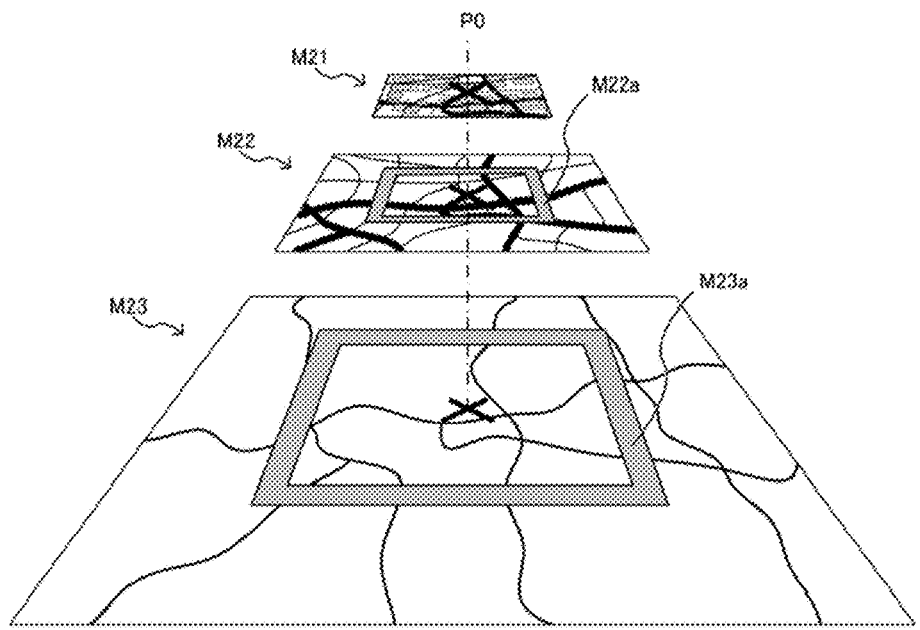
FIG. 21 is an explanatory view for showing the procedure of the bird's eye view display process to combine maps having different scales in accordance with the embodiment.
Figure 22:
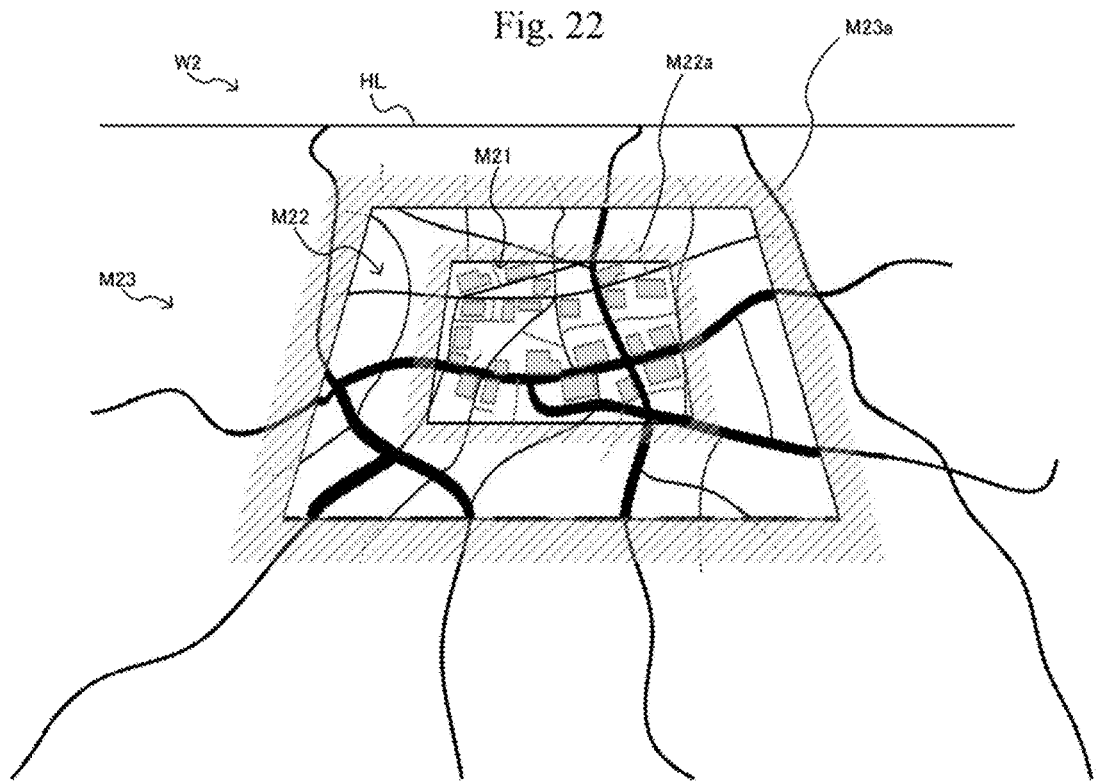
FIG. 22 is an explanatory view for showing virtual map information in a bird's eye view in accordance with the embodiment.

Then, as illustrated in FIG. 21, the display data generation unit 146 arranges a detailed map M21 having a greater scale (the denominator of the scale is small) as an upper layer with a predetermined center coordinate position P0 as a center (S402). In this case, low resolution maps M22 and M23 are successively arranged as low layers to generate the virtual map information M2. As a result, in the virtual display data W2 displaying the virtual map information M2, as illustrated in FIG. 22, a plurality of low resolution maps M22 and M23 having stepwise reduced scales and increased areas are coaxially arranged around the detailed map M21 having a greater scale.

Next, the display data generation unit 146 generates virtual map information for displaying a bird's eye view by combining these layer (S404) while performing a cross-fade process (S403) at a boundary area M22a between the detailed map M21 and the low resolution map M22 and a boundary area M23a between the low resolution map M22 and the low resolution map M23 to gradually transition one image to the other image. This cross-fade process is performed by gradually increasing the transparent degree of roads, rivers, border lines and the like toward the periphery of the high resolution map in the upper layer in order to gradually thin these profiles, and gradually thickening the low resolution map in the lower layer so that detailed lines of roads and the like displayed in the upper map are gradually disappearing near the boundary areas in accordance with their importance, so that the high resolution map naturally resolution transitions to the low resolution map as the distance from the center coordinate position P0 increases.

Incidentally, the process in steps S401 to S404 as discussed above is performed also with the real map information to generate real map information for displaying a bird's eye view. Then, the bird's eye view display process is finished after performing 3D deformation of the virtual or real map information for displaying a bird's eye view, and performing an image process such as blurring distant places (S405). At this time, each object to be displayed on the map is displayed after performing three-dimensional deformation in accordance with the camera position of the bird's eye view display and the angle and direction of the sight lines.

(3) Object Arrangement Process

As has been discussed above, the display data generation unit 146 generates the virtual display data W2 by arranging a variety of objects on coordinates of the virtual map information M2. Basically, virtual background objects Ob10 are arranged in correspondence with geographical features such as mountains, hills, rivers, roads and the like on the real map information, and the positions of buildings as main landmark. Furthermore, in the case of the present embodiment, background objects Ob10 are automatically arranged on the virtual map information also in the case where these objects Ob10, which are not included in the real map information, are needed for performance of the game, for example, to represent the environment of the map with trees in the forest, rocks in the wilderness, plants in the grassy plain and the like. FIG. 25 shows the procedure of this automatic object arrangement process.

Figure 17:
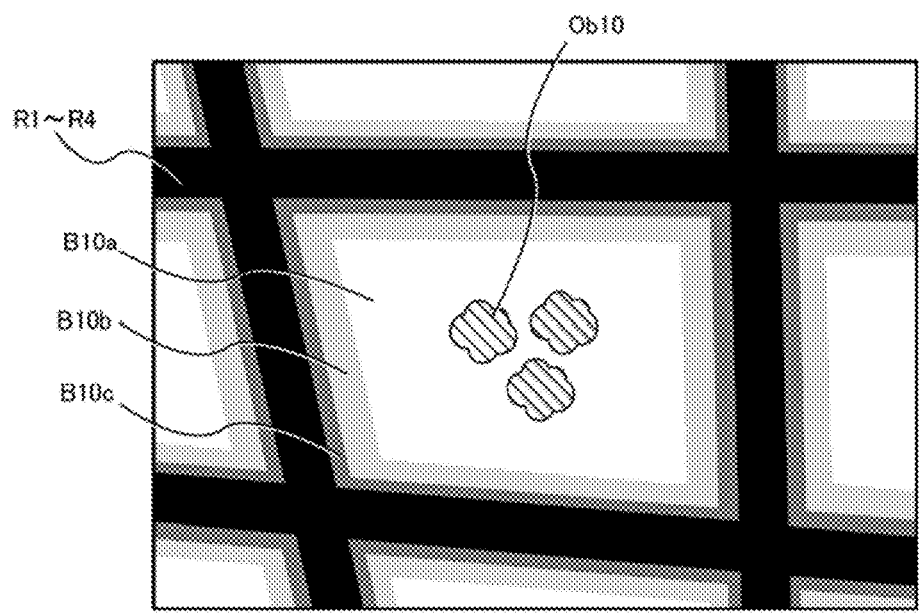
FIG. 17 is an explanatory view for showing the outline of an object arrangement process in accordance with the embodiment.

This automatic object arrangement process makes use of the gradation of stepwise blurred boundary lines in the contour generation image M11 generated by the above contour line extraction process. As has been discussed above, the display data generation unit 146 generates the contour generation image M11 in which boundary lines are blurred in the real map information by blurring color boundaries in the map image of the real map information M1. This contour generation image M11 includes a gradation image formed with such areas B10a to B10c whose color is thinned stepwise, as illustrated in FIG. 17, from black in the roads R1 to R4 to white in the area B10 by blurring the boundaries between the area B10 and the roads R1 to R4. This gradation process is performed, for example, by calculating the weighted average of an arbitrary designated picture element E10 in the real map information and eight picture elements E11 surrounding this picture element E10, and coloring these picture elements with the weighted average color to blur the designated picture element E10 and thereabout as illustrated in FIG. 13A through FIG. 13C.

Then, the object arrangement process is performed by analyzing the contour generation image M11 as gradation image (S501) as illustrated in FIG. 25. The display data generation unit 146 extracts an area having a predetermined density as an object arrangeable area from the contour generation image M11 (S502). Next, with reference to the real map information, background objects Ob10 are arranged in accordance with the attribute of the object arrangeable area (S504). For example, if the attribute of the area indicates a green area such as a forest or a park, trees are arranged as the background objects Ob10.

Incidentally, if the attribute of the area is unknown, any background object can be arranged in accordance with the story of the game progress. By this procedure, as illustrated in FIG. 18, it is possible to automatically arrange, for example, background objects Ob10 such as trees only in the areas B10a having the same color as the original area B10 in the contour generation image M11. As a result, it is possible to automatically arrange objects only near the center of a division such as the area B10 by a simple process of detecting a predetermined density area in the contour generation image M11 without a need for performing complicated arithmetic operations.

Thereafter, objects other than a background, for example, characters, and landmarks and characters required for progressing the game are arranged (S505). Incidentally, these objects other than a background may be arranged in the object arrangeable area in accordance with the attributes of these objects, or arbitrarily arranged irrespective of the object arrangeable area.

(Event Suspending Process)

Next is an explanation of the event suspending process. When the user approaches predetermined buildings B1 to B3 in the real map information M1, for example, the game progress processing unit 141 regards that the user approaches or comes upon a predetermined object O1 to O3 such as a monster on the coordinates of the virtual map information M2 in correspondence with the buildings B1 to B3 and performs the event process.

Figure 11:
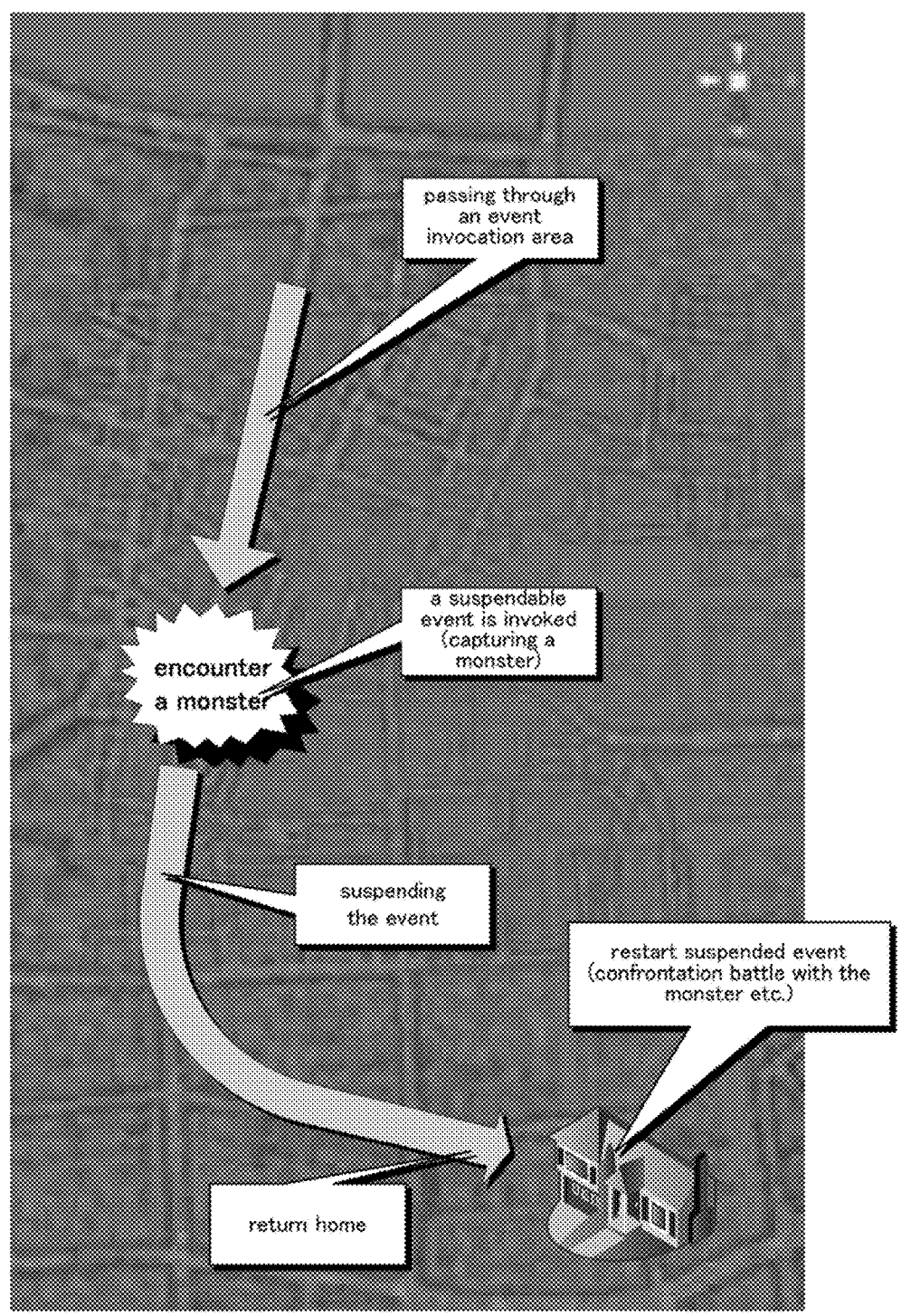
FIG. 11 is an explanatory view for showing an example of the operation of the event suspending process in accordance with the embodiment.

The event process with these objects O1 to O3 may be a confrontation battle with these objects O1 to O3, a mini game or the like. In the case of the present embodiment, after the user encounters a monster while passing an event invocation area to invoke an event process, it is possible to suspend the event process, and start the suspended event process when the user stays a certain place or when the user arrives at home or a destination in order to inhibit the so-called walking while on the smartphone. For example, as illustrated in FIG. 11, in the case where the objects O1 to O3 are virtual life bodies such as monsters or items, a confrontation battle which is a suspendable event process is invoked when the user passes an event invocation area, where these monsters or items appear, and encounters a monster as illustrated in FIG. 11. In this case, the event process is suspended whereas it is assumed that the monster is captured, and the game is progressed in accordance with moving of the user while suspending the event process. When the user comes back home, the event process is restarted to resume the confrontation battle with the monster, a mini game using the item or the like.

Figure 10:
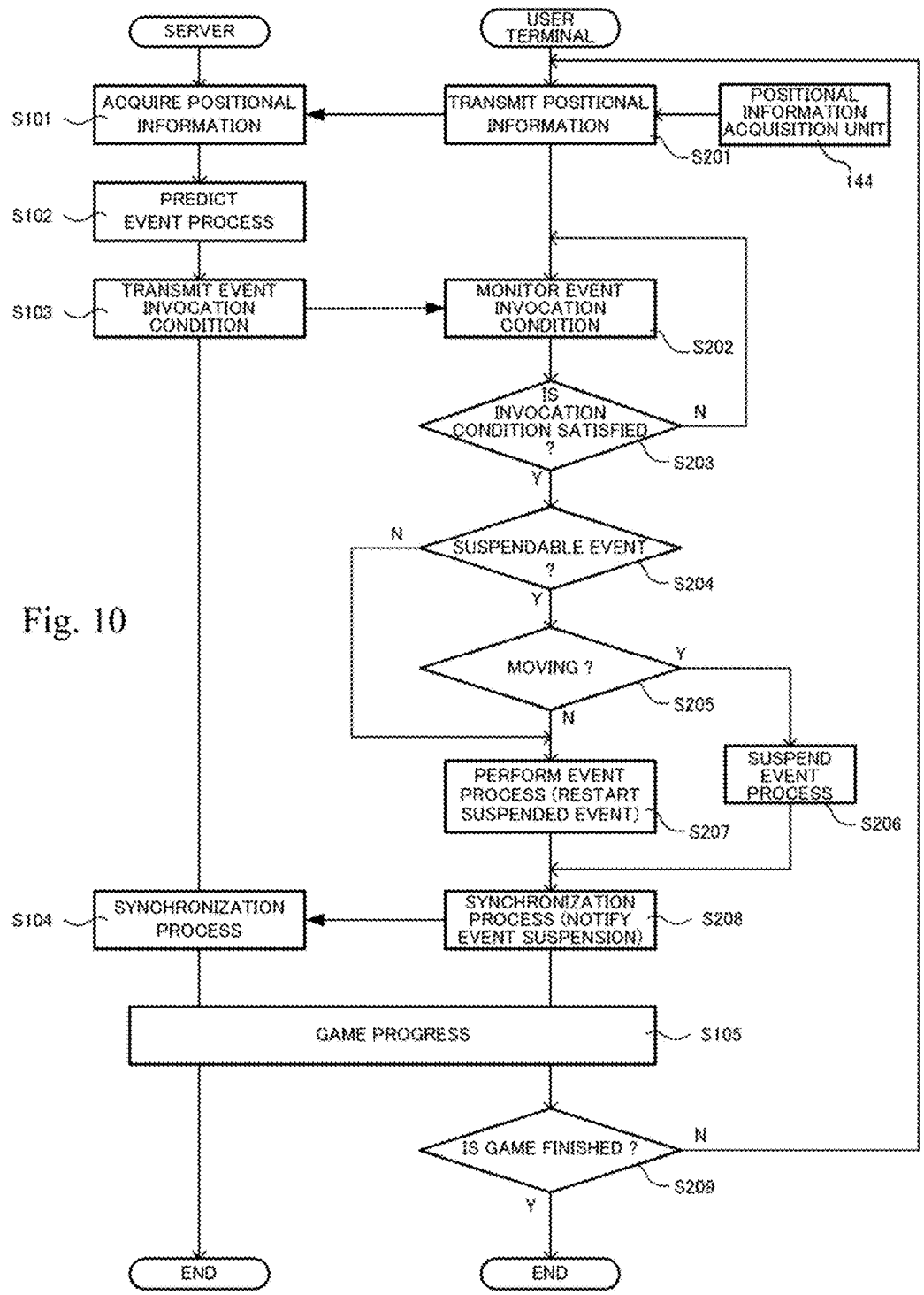
FIG. 10 is a sequence diagram for showing the operation of the event suspending process in accordance with the embodiment.

Such an event suspending process will be specifically explained. FIG. 10 is a sequence diagram for showing the operation of the event suspending process.

First, while progressing the game, positional information is periodically acquired and transmitted to the game server 3 (S201 and S101). The game server 3 predicts an event process to be invoked in accordance with the transmitted current position of each user (S102), and the invocation condition is transmitted to the smartphone 1 (S103).

More specifically speaking, on the basis of the current position of each user acquired by the game server 3, the game progress processing unit 36 of the game server 3 predicts an event process to be invoked on the basis of the positions of the characters of other users and the positions of the objects such as a monster corresponding to a building of the real world map, and generates the invocation condition thereof, which is then transmitted to the smartphone 1.

The smartphone 1 receives this invocation condition by the synchronization processing unit 142, and monitors the timing with which the invocation condition is satisfied (S202). Specifically, the event control unit 143 of the smartphone 1 monitors the invocation condition of an event process and the moving speed of the current position of own device acquired by the positional information acquisition unit 144, and suspends the suspendable event process (S206) if the event process invoked by the game progress processing unit 141 is a predetermined suspendable event process ("Y" in S204), the moving speed of the user is no lower than a predetermined value and the user is moving ("Y" in S205).

Meanwhile, in the case where the event process satisfying the invocation condition is not a suspendable event process ("N" in S204) or where the user is not moving ("N" in S205), the event process is performed as usual. In the case where there is an event process which is suspended, this event process is restarted in step S207. Then, the result (the victory/defeat or score of the battle, mini game or the like) of the event process performed by the game progress processing unit 141 of the smartphone 1 (or the result of the restarted suspended event process) is notified to the game progress processing unit 141 of the game server 3 through the synchronization processing unit 142 of the smartphone 1 (S208), and synchronized with the game server 3 (S104), and reflected in the subsequent game progress process.

On the other hand, in the case where an event process is suspended in step S206, the game progress processing unit 141 can progress the game by invoking another event process (S105) while suspending the event process to be suspended. In this case, the synchronization processing unit 142 notifies the game progress processing unit 141 in the game server 3 side of the event process suspended by the event control unit 143 to report to the game server 3 that the game is progressed while suspending the event process which satisfies the invocation condition of the event process. Receiving the report of the suspended event process, the game server 3 performs the synchronization process (S104), and reflects the report in the subsequent game progress process (S105).

The above processes are repeated until the game is finished ("N" in S209), and when an operation to terminate the game process is performed ("Y" in S209), the game is finished. Incidentally, even if the application is halted in the smartphone 1 side, the game can be continued in the game server 3 side in order that the event process is automatically suspended and restarted when the application is resumed in the smartphone 1 side.

In accordance with such an event suspending function, it is possible to inhibit the user from performing a complicated operation or steadily watching the display screen for a long time to avoid the danger arising from using a smartphone while walking.

(Effect/Action)

As has been discussed above, in accordance with the present embodiment, it is possible to perform various event processes to progress a game in a virtual world where characters corresponding to users and other objects move, wherein the operability of switching a map display between the real world and a virtual world is improved, and real world map data is converted to a virtual world map and displayed at a high speed by the above contour line extraction process and the bird's eye view display process to improve the acceleration and accuracy of the image displaying process.

Note that, this invention is not limited to the above-mentioned embodiments. Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

While the invention has been particularly shown and described with respect to preferred embodiments thereof, it should be understood by those skilled in the art that the foregoing and other changes in form and detail may be made therein without departing from the sprit and scope of the invention as defined in the appended claims.

EXPLANATION OF SYMBOLS

B1~B3 . . . building
C1 . . . character
M1 . . . real map information
M11 . . . contour generation image
M12 . . . contour line extraction image
M2 . . . virtual map information
M22, M23 . . . low resolution map
M22a, M23a . . . boundary area
O1~O3 . . . object
Ob10 . . . background object
W1 . . . real display data
W2 . . . virtual display data
1 (1a, 1b) smartphone
2 . . . Internet
3 . . . game server
10a, 10b . . . user
11 . . . communication interface
12 . . . input interface
12a . . . touch panel
13 . . . output interface
13a . . . display
14 . . . application running unit
15 . . . memory
21 . . . satellite
22 . . . wireless base station
31 . . . communication interface
32 . . . positional information management unit
33 . . . authentication unit
34 . . . game data delivering unit
35a . . . real map database
35b . . . user database
35c . . . game database
36 . . . game progress processing unit
37 . . . virtual map information management unit
141 . . . game progress processing unit
142 . . . synchronization processing unit
143 . . . event control unit
144 . . . positional information acquisition unit
145 . . . display control unit
146 . . . display data generation unit

What is claimed is:

1. A game image processing system which invokes various event processes to progress a game in a virtual world where a character corresponding to a user and other objects move, comprising:
a game progress processing unit which progresses the game by invoking the various event processes;
a real map storage unit which stores real map information containing geographical information in a real world;
a virtual map information generation unit which generates virtual map information including coordinate information of the objects on virtual geographical information corresponding to the geographical information on the real map information in accordance with a game progress by the game progress processing unit;
a positional information acquisition unit which selects a coordinate position in the real world;
a real display data generation unit which generates real display data indicating the coordinate position selected by the positional information acquisition unit on the real map information on the basis of the coordinate position;
a virtual display data generation unit which generates virtual display data showing the character on the virtual map information corresponding to the coordinate position acquired by the positional information acquisition unit on the basis of the coordinate position; and
a display control unit which displays both or selected one of the virtual display data generated by the virtual display data generation unit and the real display data generated by the real display data generation unit, or displays part of either one overlapping the other,
wherein the virtual display data generation unit coaxially arranges a plurality of low resolution maps having stepwise reduced scales and increased areas around a detailed map having a greater scale in a predetermined coordinate position as a center, and performs a fade process at a boundary area between the detailed map and the low resolution map and a boundary area between one and another of the low resolution maps to gradually transition one image to the other image.

2. The game image processing system of claim 1 wherein the positional information acquisition unit acquires the current position of a user, and selects the acquired current position of the user as the coordinate position.

3. The game image processing system of claim 1 wherein the virtual display data generation unit generates a contour generation image in which a boundary line is blurred in the real map information by blurring the image of the real map information, generates a contour line extraction image from a difference between the contour generation image and the real map information, and generates the virtual map information on the basis of this contour line extraction image.

4. The game image processing system of claim 1 wherein the virtual display data generation unit generates a gradation image in which a boundary line is stepwise blurred in the real map information by blurring the image of the real map information, extracts an area having a predetermined density in this gradation image, and arranges predetermined objects on the extracted area as an object arrangeable area.

5. The game image processing system of claim 1 wherein the display control unit changes the display of the real display data and/or the virtual display data or the operation of displaying the same in accordance with the progress of the game by the game progress processing unit.

6. A game image processing program for use in a game system which performs various event processes to progress a game in a virtual world where a character corresponding to a user and other objects move, and for causing a mobile terminal device used by the user to function as:
a game progress processing unit which progresses the game by invoking the various event processes;
a real map storage unit which stores real map information containing geographical information in a real world;
a virtual map information generation unit which generates virtual map information including coordinate information of the objects on virtual geographical information corresponding to the geographical information on the real map information in accordance with a game progress by the game progress processing unit;

a positional information acquisition unit which selects a coordinate position in the real world;

a real display data generation unit which generates real display data indicating the coordinate position selected by the positional information acquisition unit on the real map information on the basis of the coordinate position;

a virtual display data generation unit which generates virtual display data showing the character on the virtual map information corresponding to the coordinate position acquired by the positional information acquisition unit on the basis of the coordinate position; and a display control unit which displays both or selected one of the virtual display data generated by the virtual display data generation unit and the real display data generated by the display data generation unit, wherein the virtual display data generation unit coaxially arranges a plurality of low resolution maps having stepwise reduced scales and increased areas around a detailed map having a greater scale in a predetermined coordinate position as a center, and performs a fade process at a boundary area between the detailed map and the low resolution map and a boundary area between one and another of the low resolution maps to gradually transition one image to the other image.

7. The game image processing system of claim 6 wherein the positional information acquisition unit acquires the current position of a user, and selects the acquired current position of the user as the coordinate position.

8. The game image processing system of claim 6 wherein the virtual display data generation unit generates a contour generation image in which a boundary line is blurred in the real map information by blurring the image of the real map information, generates a contour line extraction image from a difference between the contour generation image and the real map information, and generates the virtual map information on the basis of this contour line extraction image.

9. The game image processing system of claim 6 wherein the virtual display data generation unit generates a gradation image in which a boundary line is stepwise blurred in the real map information by blurring the image of the real map information, extracts an area having a predetermined density in this gradation image, and arranges predetermined objects on the extracted area as an object arrangeable area.

10. The game image processing system of claim 6 wherein the display control unit changes the display of the real display data and/or the virtual display data or the operation of displaying the same in accordance with the performing of the event process or the progress of the game.

* * * * *